United States Patent
Robinson et al.

(10) Patent No.: US 12,516,591 B2
(45) Date of Patent: *Jan. 6, 2026

(54) ELECTRIC POWERED HYDRAULIC FRACTURING PUMP SYSTEM WITH SINGLE ELECTRIC POWERED MULTI-PLUNGER FRACTURING PUMP

(71) Applicant: U.S. Well Services, LLC, Willow Park, TX (US)

(72) Inventors: Lon Robinson, Willow Park, TX (US); Jared Oehring, Willow Park, TX (US); Brandon N. Hinderliter, Porter, TX (US)

(73) Assignee: U.S. Well Services, LLC, Willow Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/795,931

(22) Filed: Aug. 6, 2024

(65) Prior Publication Data

US 2024/0392666 A1  Nov. 28, 2024

Related U.S. Application Data

(63) Continuation of application No. 18/512,755, filed on Nov. 17, 2023, now Pat. No. 12,084,952, which is a continuation of application No. 17/959,465, filed on Oct. 4, 2022, now Pat. No. 11,905,806, which is a
(Continued)

(51) Int. Cl.
*E21B 43/17* (2006.01)
*E21B 43/26* (2006.01)

(52) U.S. Cl.
CPC .......... *E21B 43/17* (2013.01); *E21B 43/2607* (2020.05)

(58) Field of Classification Search
CPC ....... E21B 43/2607; E21B 43/26; E21B 43/17
See application file for complete search history.

(56) References Cited

U.S. PATENT DOCUMENTS

| | | |
|---|---|---|
| 1,541,601 A | 6/1925 | Tribe |
| 1,743,771 A | 1/1930 | Hall |
| (Continued) | | |

FOREIGN PATENT DOCUMENTS

| | | |
|---|---|---|
| CA | 3067854 | 1/2019 |
| CN | 104117308 | 10/2014 |
| (Continued) | | |

OTHER PUBLICATIONS

Declaration of Dr. Mark Ehsani, IPR2021-01066, Jul. 2, 2021, 213 pages.
(Continued)

*Primary Examiner* — Matthew R Buck
(74) *Attorney, Agent, or Firm* — Henry Patent Law Firm PLLC

(57) ABSTRACT

A hydraulic fracturing system includes a support structure having a first area at a first height and a second area at a second height, the first and second areas adjacent one another. The system also includes an electric powered, multi-plunger pump with an odd number of plungers, arranged in the first area, the electric powered pump coupled to a well, via outlet piping, and powered by at least one electric motor, also arranged in the first area. The system further includes a variable frequency drive (VFD), arranged in the second area, connected to the at least one electric motor, the VFD configured to control at least a speed of the at least one electric motor. The system also includes a transformer, arranged in the second area, the transformer positioned within an enclosure with the VFD, the transformer distributing power to the electric pump.

15 Claims, 5 Drawing Sheets

Related U.S. Application Data continuation of application No. 17/060,647, filed on Oct. 1, 2020, now Pat. No. 11,459,863.

(60) Provisional application No. 62/910,163, filed on Oct. 3, 2019.

(56) References Cited

U.S. PATENT DOCUMENTS

| | | |
|---|---|---|
| 1,967,466 A | 7/1934 | Damsel |
| 2,244,106 A | 6/1941 | Granberg et al. |
| 2,976,025 A | 3/1961 | Pro |
| 3,347,570 A | 10/1967 | Roessler et al. |
| 3,878,884 A | 4/1975 | Raleigh |
| 3,967,841 A | 7/1976 | Kendrick et al. |
| 4,411,313 A | 10/1983 | Johnson et al. |
| 4,442,665 A | 4/1984 | Fick et al. |
| 4,538,916 A | 9/1985 | Zimmerman |
| 4,601,629 A | 7/1986 | Zimmerman |
| 4,768,884 A | 9/1988 | Elkin et al. |
| 4,783,038 A | 11/1988 | Gilbert et al. |
| 5,293,947 A | 3/1994 | Stratton |
| 5,334,899 A | 8/1994 | Skybyk |
| 5,439,066 A | 8/1995 | Gipson |
| 5,486,047 A | 1/1996 | Zimmerman |
| 5,517,822 A | 5/1996 | Haws et al. |
| 5,549,285 A | 8/1996 | Collins |
| 5,606,853 A | 3/1997 | Birch et al. |
| 5,791,636 A | 8/1998 | Loziuk |
| 5,798,596 A | 8/1998 | Lordo |
| 5,813,455 A | 9/1998 | Pratt et al. |
| 5,894,888 A | 4/1999 | Wiemers et al. |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,273,193 B1 | 8/2001 | Hermann et al. |
| 6,315,523 B1 | 11/2001 | Mills |
| 6,406,011 B1 | 6/2002 | Kosar et al. |
| 6,442,942 B1 | 9/2002 | Kopko |
| 6,510,695 B1 | 1/2003 | Fisher |
| 6,585,455 B1 | 7/2003 | Petersen et al. |
| 6,626,646 B2 | 9/2003 | Rajewski |
| 6,765,304 B2 | 7/2004 | Baten et al. |
| 6,788,022 B2 | 9/2004 | Sopko et al. |
| 6,837,910 B1 | 1/2005 | Yoshikawa et al. |
| 6,985,750 B1 | 1/2006 | Vicknair et al. |
| 7,170,262 B2 | 1/2007 | Pettigrew |
| 7,279,655 B2 | 10/2007 | Blutke |
| 7,309,835 B2 | 12/2007 | Morrison |
| 7,341,287 B2 | 3/2008 | Gibb et al. |
| 7,494,263 B2 | 2/2009 | Dykstra et al. |
| 7,717,193 B2 | 5/2010 | Egilsson et al. |
| 7,770,396 B2 | 8/2010 | Roby et al. |
| 7,795,830 B2 | 9/2010 | Johnson |
| 7,807,048 B2 | 10/2010 | Collette |
| 7,845,413 B2 | 12/2010 | Shampine et al. |
| 7,900,893 B2 | 3/2011 | Teurlay et al. |
| 7,940,039 B2 | 5/2011 | De Buda |
| 8,146,665 B2 | 4/2012 | Neal |
| 8,221,513 B2 | 7/2012 | Ariyapadi et al. |
| 8,272,439 B2 | 9/2012 | Strickland |
| RE44,444 E | 8/2013 | Dole et al. |
| 8,506,267 B2 | 8/2013 | Gambier et al. |
| 8,556,302 B2 | 10/2013 | Dole |
| 8,616,274 B2 | 12/2013 | Belcher et al. |
| 8,763,387 B2 | 7/2014 | Schmidt |
| 8,789,601 B2 | 7/2014 | Broussard et al. |
| 8,795,525 B2 | 8/2014 | Mcginnis et al. |
| 8,905,056 B2 | 12/2014 | Kendrick |
| 8,997,904 B2 | 4/2015 | Cryer et al. |
| 9,051,925 B2 | 6/2015 | Kuo et al. |
| 9,062,545 B2 | 6/2015 | Roberts et al. |
| 9,140,105 B2 | 9/2015 | Pattillo |
| 9,353,593 B1 | 5/2016 | Lu et al. |
| 9,410,410 B2 | 8/2016 | Broussard et al. |
| 9,450,385 B2 | 9/2016 | Kristensen |
| 9,482,086 B2 | 11/2016 | Richardson et al. |
| 9,506,333 B2 | 11/2016 | Castillo et al. |
| 9,534,473 B2 | 1/2017 | Morris et al. |
| 9,706,185 B2 | 7/2017 | Ellis |
| 9,739,546 B2 | 8/2017 | Bertilsson et al. |
| 9,745,840 B2 | 8/2017 | Oehring et al. |
| 9,790,858 B2 | 10/2017 | Kanebako |
| 9,840,901 B2 | 12/2017 | Oehring et al. |
| 9,893,500 B2 | 2/2018 | Oehring et al. |
| 9,903,190 B2 | 2/2018 | Conrad et al. |
| 9,945,365 B2 * | 4/2018 | Hernandez ............. F04B 47/02 |
| 9,970,278 B2 | 5/2018 | Broussard et al. |
| 10,020,711 B2 | 7/2018 | Oehring et al. |
| 10,119,381 B2 | 11/2018 | Oehring et al. |
| 10,184,465 B2 | 1/2019 | Enis et al. |
| 10,221,639 B2 | 3/2019 | Romer et al. |
| 10,254,732 B2 | 4/2019 | Oehring et al. |
| 10,280,724 B2 | 5/2019 | Hinderliter |
| 10,302,079 B2 | 5/2019 | Kendrick |
| 10,337,308 B2 | 7/2019 | Broussard et al. |
| 10,408,030 B2 | 9/2019 | Oehring et al. |
| 10,408,031 B2 | 9/2019 | Oehring et al. |
| 10,415,332 B2 | 9/2019 | Morris et al. |
| 10,526,882 B2 | 1/2020 | Oehring |
| 10,627,003 B2 | 4/2020 | Dale et al. |
| 10,648,270 B2 | 5/2020 | Brunty et al. |
| 10,648,311 B2 | 5/2020 | Oehring et al. |
| 10,669,471 B2 | 6/2020 | Schmidt et al. |
| 10,686,301 B2 | 6/2020 | Oehring et al. |
| 10,690,131 B2 | 6/2020 | Rashid et al. |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,934,824 B2 | 3/2021 | Oehring et al. |
| 10,988,998 B2 * | 4/2021 | Fischer ............. E21B 43/2605 |
| 11,091,992 B2 | 8/2021 | Broussard et al. |
| 11,459,863 B2 * | 10/2022 | Robinson ............. E21B 43/127 |
| 11,905,806 B2 * | 2/2024 | Robinson ............. E21B 43/127 |
| 12,084,952 B2 * | 9/2024 | Robinson ............. E21B 43/127 |
| 2003/0057704 A1 | 3/2003 | Baten |
| 2004/0045703 A1 | 3/2004 | Hooper et al. |
| 2005/0116541 A1 | 6/2005 | Seiver |
| 2007/0125544 A1 | 6/2007 | Robinson et al. |
| 2007/0201305 A1 | 8/2007 | Heilman et al. |
| 2008/0095644 A1 | 4/2008 | Mantei et al. |
| 2008/0217024 A1 | 9/2008 | Moore |
| 2008/0236818 A1 | 10/2008 | Dykstra |
| 2008/0277120 A1 | 11/2008 | Hickie |
| 2008/0288115 A1 | 11/2008 | Rusnak et al. |
| 2009/0068031 A1 | 3/2009 | Gambier et al. |
| 2009/0068301 A1 | 3/2009 | Huang |
| 2009/0072645 A1 | 3/2009 | Quere |
| 2009/0078410 A1 | 3/2009 | Krenek et al. |
| 2009/0114392 A1 | 5/2009 | Tolman et al. |
| 2009/0153354 A1 | 6/2009 | Duassin et al. |
| 2009/0308602 A1 | 12/2009 | Bruins et al. |
| 2009/0315297 A1 | 12/2009 | Nadeau et al. |
| 2010/0038907 A1 | 2/2010 | Hunt et al. |
| 2010/0193057 A1 | 8/2010 | Garner |
| 2010/0250139 A1 | 9/2010 | Hobbs et al. |
| 2010/0281876 A1 | 11/2010 | Khan et al. |
| 2011/0061855 A1 | 3/2011 | Case et al. |
| 2011/0110793 A1 | 5/2011 | Leugemors et al. |
| 2011/0175397 A1 | 7/2011 | Amrine, Jr. et al. |
| 2011/0197988 A1 | 8/2011 | Van Vliet et al. |
| 2011/0241590 A1 | 10/2011 | Horikoshi et al. |
| 2012/0112757 A1 | 5/2012 | Vrankovic et al. |
| 2012/0152716 A1 | 6/2012 | Kikukawa et al. |
| 2012/0255734 A1 | 10/2012 | Coli et al. |
| 2013/0051971 A1 | 2/2013 | Wyse et al. |
| 2013/0078114 A1 | 3/2013 | Van Rijswick et al. |
| 2013/0138254 A1 | 5/2013 | Seals |
| 2013/0189629 A1 | 7/2013 | Chandler |
| 2013/0255271 A1 | 10/2013 | Yu et al. |

(56) References Cited

U.S. PATENT DOCUMENTS

| | | | |
|---|---|---|---|
| 2013/0284455 A1 | 10/2013 | Kajaria et al. | |
| 2013/0306322 A1 | 11/2013 | Sanborn et al. | |
| 2014/0077607 A1 | 3/2014 | Clarke et al. | |
| 2014/0138079 A1 | 5/2014 | Broussard et al. | |
| 2014/0174717 A1* | 6/2014 | Broussard | E21B 43/2607 166/66.4 |
| 2014/0294603 A1 | 10/2014 | Best | |
| 2015/0027712 A1* | 1/2015 | Vicknair | E21B 43/162 166/305.1 |
| 2015/0114652 A1 | 4/2015 | Lestz et al. | |
| 2015/0144336 A1 | 5/2015 | Hardin et al. | |
| 2015/0252661 A1* | 9/2015 | Glass | E21B 43/2607 166/308.1 |
| 2016/0006311 A1 | 1/2016 | Li | |
| 2016/0230660 A1 | 8/2016 | Zeitoun et al. | |
| 2016/0258267 A1 | 9/2016 | Payne et al. | |
| 2016/0273456 A1 | 9/2016 | Zhang | |
| 2016/0290114 A1 | 10/2016 | Oehring et al. | |
| 2016/0326853 A1 | 11/2016 | Fredd et al. | |
| 2016/0326854 A1 | 11/2016 | Broussard et al. | |
| 2016/0348479 A1 | 12/2016 | Oehring et al. | |
| 2017/0016433 A1 | 1/2017 | Chong et al. | |
| 2017/0030177 A1* | 2/2017 | Oehring | E21B 7/02 |
| 2017/0043280 A1 | 2/2017 | Vankouwenberg | |
| 2017/0074076 A1 | 3/2017 | Joseph et al. | |
| 2017/0082033 A1 | 3/2017 | Wu et al. | |
| 2017/0138171 A1 | 5/2017 | Richards et al. | |
| 2017/0212535 A1 | 7/2017 | Shelman et al. | |
| 2017/0226842 A1 | 8/2017 | Omont et al. | |
| 2017/0370639 A1 | 12/2017 | Bardon et al. | |
| 2018/0090914 A1 | 3/2018 | Johnson et al. | |
| 2018/0181830 A1 | 6/2018 | Luharuka et al. | |
| 2018/0259080 A1 | 9/2018 | Dale et al. | |
| 2018/0266217 A1 | 9/2018 | Funkhouser et al. | |
| 2018/0284817 A1 | 10/2018 | Cook et al. | |
| 2018/0298731 A1 | 10/2018 | Bishop et al. | |
| 2018/0312738 A1 | 11/2018 | Rutsch et al. | |
| 2018/0363640 A1 | 12/2018 | Kajita et al. | |
| 2018/0366950 A1 | 12/2018 | Pedersen et al. | |
| 2019/0112908 A1* | 4/2019 | Coli | E21B 43/267 |
| 2019/0154020 A1 | 5/2019 | Glass | |
| 2019/0249527 A1 | 8/2019 | Kraynek | |
| 2019/0338762 A1* | 11/2019 | Curry | F04B 17/03 |
| 2020/0040878 A1* | 2/2020 | Morris | E21B 43/2607 |
| 2020/0047141 A1 | 2/2020 | Oehring et al. | |
| 2020/0088152 A1 | 3/2020 | Alloin | |
| 2020/0325760 A1* | 10/2020 | Markham | E21B 43/26 |
| 2020/0340404 A1* | 10/2020 | Stockstill | E21B 43/2607 |
| 2020/0350790 A1 | 11/2020 | Luft et al. | |
| 2020/0378232 A1* | 12/2020 | Sharp | E21B 43/2607 |
| 2023/0146951 A1 | 5/2023 | Robinson et al. | |
| 2024/0084680 A1 | 3/2024 | Robinson et al. | |

FOREIGN PATENT DOCUMENTS

| | | |
|---|---|---|
| CN | 104196613 | 12/2014 |
| CN | 205986303 | 2/2017 |
| CN | 108049999 | 5/2018 |
| CN | 112196508 | 1/2021 |
| WO | 200047893 | 8/2000 |
| WO | 2009046280 | 4/2009 |
| WO | 2012051705 | 4/2012 |
| WO | 2014116761 | 7/2014 |
| WO | 2014177346 | 11/2014 |
| WO | 2018044307 | 3/2018 |
| WO | 2018213925 | 11/2018 |
| WO | 2019210417 | 11/2019 |

OTHER PUBLICATIONS

Declaration of Dr. Robert Durham, Case Nos. IPR2021-01033, IPR2021-01032 and IPR2021-01034, Jun. 18, 2021, 179 pages.
Declaration of Dr. Robert Durham, IPR2021-01065, Jun. 18, 2021, 138 pages.
Declaration of Duncan Hall, Internet Archive, Oct. 26, 2021, http://web.archive.org/web/20140531134153/http://www.amazon.com/StarTech-NETRS2321E-RS-232-Serial-Ethernet/dp/B000YB0NOS, 43 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Joel N. Broussard, Case Nos. IPR2021-01032 & IPR2021-01033, Oct. 13, 2021, 9 pages.
Declaration of Joel N. Broussard, IPR2021-01034, IPR2021-01035, IPR2021-01036, and IPR2021-01037, Oct. 20, 2021, 11 pages.
Declaration of Joel N. Broussard, IPR2021-01038, Oct. 20, 2021, 11 pages.
Declaration of Joel N. Broussard, IPR2021-01065, Oct. 20, 2021, 11 pages.
Declaration of Nathaniel E. Frank-White, Internet Archive, Feb. 17, 2022, http://web.archive.org/web/20140329090440/http://www.enidline.com/pdffiles/WR_catalog_2012.pdf, 82 pages.
Declaration of Robert Durham, IPR2021-01315, Aug. 12, 2021, 209 pages.
Declaration of Robert Durham, IPR2021-01316, Aug. 13, 2021, 75 pages.
Declaration of Robert Durham, IPR2022-00074, Nov. 8, 2021, 177 pages.
Declaration of Robert Schaaf, Case Nos. IPR-2021-01032 and IPR2021-01033, Oct. 12, 2021, 45 pages.
Declaration of Robert Schaaf, IPR2021-01034, Oct. 20, 2021, 47 pages.
Declaration of Robert Schaaf, IPR2021-01035, Oct. 20, 2021, 51 pages.
Declaration of Robert Schaaf, IPR2021-01037, Oct. 20, 2021, 52 pages.
Declaration of Robert Schaaf, IPR2021-01038, Nov. 10, 2021, 40 pages.
Declaration of Robert Schaaf, IPR2021-01065, Nov. 10, 2021, 33 pages.
Declaration of Robert Schaaf, IPR2021-01066, Nov. 17, 2021, 43 pages.
Declaration of Robert Schaaf, IPR2021-01238, Nov. 17, 2021, 38 pages.
Declaration of Robert Schaaf, IPR2021-01315, Nov. 19, 2021, 39 pages.
Declaration of Robert Schaaf, IPR2021-01316, Nov. 19, 2021, 33 pages.
Declaration of Robert Schaaf, IPR2021-01538, Dec. 28, 2021, 40 pages.
Declaration of Robert Schaaf, IPR2021-01539, Jan. 25, 2022, 37 pages.
Declaration of Robert Schaaf, IPR2022-00074, Feb. 17, 2022, 36 pages.
Declaration of Sylvia D. Hall-Ellis, IPR2022-00610, Feb. 28, 2022, 98 pages.
Declaration of Sylvia D. Hall-Ellis, Ph.D., Case Nos. IPR2021-01032, IPR2021-01033, and IPR2021-01034, Jun. 18, 2021, 173 pages.
Department of Transportation, Federal Motor Carrier Safety Administration, 49 CFR Parts 390, 392 and 393—Parts and Accessories Necessary for Safe Operation; General Amendments; final Rule, Federal Register, Aug. 15, 2005, vol. 70, No. 156, 49 pages.
Donald G. Fink, "Standard Handbook for Electrical Engineers—Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16.
Dr. Nedelcut et al., "Online and Off-line Monitoring—Diagnosis System (MDS) for Power Transformers, "IEEE, 2008 International Conference on Condition Monitoring and Diagnosis, Beijing, China, Apr. 21-24, 2008, 7 pages.
Elsevier, "Variable Speed Pumping—A Guide to Successful Applications," 2019, 186 pages.
Email from Michael See on Jun. 10, 2021 regarding API-541 Fourt Edition: Public Availability, 2 pages.

(56) References Cited

OTHER PUBLICATIONS

Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90.
Eugene A. Avallone, Marks' Standard Handbook for Mechanical Engineers: 11th Edition, 2007, p. 16-4 and 16-22.
Eugene A. Avallone, Marks' Standard Handbook for Mechanical Engineers: 11th Edition, 2007, Section 14, 18 pages.
U.S. Appl. No. 62/180,289, filed Jun. 16, 2015.
U.S. Appl. No. 62/323,303, filed Apr. 15, 2016.
U.S. Appl. No. 62/204,331, filed Aug. 12, 2015.
U.S. Appl. No. 62/242,173, filed Oct. 15, 2015.
U.S. Appl. No. 62/242,566, filed Oct. 16, 2015.
U.S. Appl. No. 62/323,168, filed Apr. 15, 2016.
"Professional Publications, Inc., FE Exam, PE Exam, ARE Exam, and NCIDQ Exam Review / Professional Engineering Licensing, Instructor's Corner,", https://web.archive.org/web/20031219232547/http://ppi2pass.com:80/catalog/servlet/MyPpi_pg_corner-corner.htlm, accessed Jul. 19, 2021, 2 pages.
"Professional Publications, Inc., FE Exam, PE Exam, ARE Exam, and NCIDQ Exam Review / Professional Engineering Licensing, Teaching an Electrical and Computer Engineering PE Exam Review Course", https://web.archive.org/web/20031223100101/http:ppi2pass.com:80/catalog/servlet/MyPpi_pg_corner-teachee.html, accessed Jul. 19, 2021, 2 pages.
"Professional Publications, Inc., FE Exam, PE Exam, ARE Exam, and NCIDQ Exam Review / Professional Engineering Licensing, The PPI Online Catalog", https://web.archive.org/web/20040215142016/http://ppi2pass.com:80/catalog/servlet/MyPpi_ct_MAIN, accessed Jul. 19, 2021, 2 pages.
"Professional Publications, Inc., FE Exam, PE Exam, ARE Exam, and NCIDQ Exam Review / Professional Engineering Licensing, What PPI Customers Say,", https://web.archive.org/web/20031226130924/http://ppi2pass.com:80/catalog/servlet/MyPpi_pg_comments-EEcomments.html, accessed Jul. 22, 2021.
"Public Catalog of the U.S. Copyright Office for search result: electrical engineering reference manual", https://cocatalog.oc.gov/cgi-in/Pwebrecon.cgi?v1=6&ti=1, 6&Search_Arg=electrical engineering referencemanual&search_code=TALL&CNT=25&PI . . . , accessed Jul. 21, 2021, 2 pages.
"U.S. Well Services, Inc. files suit against Halliburton Company and Cimarex Energy Co. for patent infringement", Apr. 15, 2021, PR Newswire, https://www.prnewswire.com/news-releases/us-well-services-inc-files-suit-against-halliburton-comapny-and-climax-energy-co-for-patent-infringement-301270118.html, 2 pages.
Final Office Action issued in U.S. Appl. No. 16/356,263 mailed Oct. 7, 2021.
Final Office Action mailed Feb. 4, 2021 in U.S. Appl. No. 16/597,014.
Final Office Action mailed Jan. 11, 2021 in U.S. Appl. No. 16/404,283.
Final Office Action mailed Jan. 21, 2021 in U.S. Appl. No. 16/458,696.
Flowline Products and Services, FMC Technologies, http://www.fmctechnologies.com, 80 pages.
Gardner Denver, 3" 1502 Male Hammer Union Discharge Flange, 2005, 13 pages.
Gardner Denver, Well Servicing Pump Model GD-2500Q, GD-2500Q-HD, Quintuplex Pumps, Sep. 2011, 45 pages.
Halliburton, Halliburton All-Electric Fracturing Reducing Emissions and Cost Brochure, 2021, 6 pages.
Hart Energy, Hydraulic Fracturing Techbook, 2015, 99 pages.
Hazard Alert—Worker exposure to Silica during Hydraulic Fracturing, United States Department of Labor, https://web.archive.org/web/20120808200919/http://www.osha.gov/dts/hazardalerts/hydraulic_frac_hazard_alert.html, accesed Jun. 13, 2021, 5 pages.
Henry Chajet, "OSHA Issues Alert on Non-Silica Fracking Hazards," Jan. 30, 2015, National Law Review Newsroom, 2 pages.
IEEE Authoritative Dictionary of IEEE Standards Terms Seventh Edition, 2000, 7 pages.
IEEE Power Engineering Society, 112 IEEE Standard Test Procedure for Polyphase Induction Motors and Generators, 2004, 87 pages.
Industrial Safety & Hygiene News, OSHA issues Hazard alert for fracking and drilling, Jan. 6, 2015, 1 page.
Industry/Hazard Alerts, United States Department of Labor, https://web.archive.org/web/20120801064838/http://www.osha.gov:80/hazardindex.html, accessed Jun. 13, 2021, 1 page.
International Search and Written Opinion Mailed Aug. 28, 2020 in PCT/US20/23821.
International Search Report and Written Opinion mailed Dec. 14, 2020 in PCT/ US2020/53980.
International Search Report and Written Opinion mailed Feb. 2, 2021 in PCT/US20/58906.
International Search Report and Written Opinion mailed Feb. 3, 2021 in PCT/US20/58899.
International Search Report and Written Opinion mailed Feb. 4, 2021 in PCT/US20/59834.
International Search Report and Written Opinion mailed in PCT/US/67526 mailed May 6, 2021.
International Search Report and Written Opinion mailed in PCT/US20/67146 mailed Mar. 29, 2021.
International Search Report and Written Opinion mailed in PCT/US20/67523 mailed Mar. 22, 2021.
International Search Report and Written Opinion mailed in PCT/US20/67528 mailed Mar. 19, 2021.
International Search Report and Written Opinion mailed in PCT/US20/67608 mailed Mar. 30, 2021.
International Search Report and Written Opinion mailed in PCT/US2020/066543 mailed May 11, 2021.
International Search Report and Written Opinion Mailed Sep. 3, 2020 in PCT/US2020/36932.
J. Malinowski et al., "Petrochemical Standards A Comparison Between IEEE 841-2001, API 541, and API 547," 2004, IEEE, Paper No. PCIC-2004-22, 8 pages.
Janice Hoppe-Spiers, "Deploying Change," Energy & Mining International, Spring 2017, http://www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-US-well-services-llc, 3 pages.
John A. Camera, PE, Electrical Engineering Reference Manual for the Electrical and Computer PE Exam, Sixth Edition, 2002, 102 pages.
John Daniel, "8.30 DEP Industry Observations: New Flac Fleet; New Fleet Designs Forthcoming," Daniel Energy Partners, Aug. 30, 2020, 13 pages.
Katsuhiko Ogata, Modern Control Engineering: Third Edition, 1997, 2 pages.
Kirsch Research and Development, LLC v Tarco Specialty Products, Inc., Case No. 6:20-cv-00318-ADA, Doc 62, Memorandum Opinion & Order Grant Defendant's Opposed Motion to Stay Pending inter Partes Review of the '482 Patent, Oct. 4, 2021, 6 pages.
Kroposki et al., Making Microgrids Work, 6 IEEE Power and Energy Mag. 40, 41 (2008).
Ledcomm LLC v Signify North America Corp., Signify Holding B.V., and Signify N.V., Case No. 6:20-cv-01056-ADA, Document 24, Scheduling Order, Aug. 13, 2021, 4 pages.
LedComm LLC v Signify North America Corporation, Case No. 6:20-cv-01056-ADA, Civil Docket, accessed Dec. 8, 2021, 11 pages.
Lionel B. Roe, Practices and Procedures of Industrial Electrical Design, 1972, McGraw-Hill, Inc., Chapter 2: The Basic Electric System, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
M. E. Rahman et al., "Wire rope isolators for vibration isolation of equipment and structures—A review," IOP Conference Series Materials Science and Engineering, Apr. 2015, 12 pages.

(56) References Cited

OTHER PUBLICATIONS

"Global Cache iTach, IP to Serial with PoE (IP2SL-P)," Global Cache, https://www.amazon.com/Global-Cache-iTech-Serial-IP2SL-P/dp/B003BFVNS4/, Oct. 30, 2014, 3 pages.
"Halliburton Delivers Successful Grid-Powered Frac Operation,"https://www.halliburton.com/en/about-us/press-release/halliburton-delivers-first-successful-grid-powered-fracturing-operation, accessed Sep. 27, 2021, 4 pages.
"Heat Exchanger" (https://en.wikipedia.org/w/index.php?title=Heat_exchanger&oldid=89300146) Apr. 12-18-19, 2019 (Apr. 18, 2019), entire document, especially para (0001].
"Kerr Pumps & FlowVale Awards for Excellence in Well Completion, Northeast 2017—Awarded to: U.S. Well Services, https://www.oilandgasawards.com/winner/noertheast-2017-kerr-pumps-flowvales-awards . . . ", accessed Oct. 5, 2021, 4 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
"Process Burner" (https://www.cebasrt.com/productsloii-gaslprocess-burner) 06 Sep. 6, 2018 (Sep. 6, 2018), entire document, especially para (Burners for refinery Heaters).
"SainSmart TCP/IP Ethernet to Serial RS232 RS485 Intelligent Communication Converter," SainSmart, http://www.amazon.com/SainSmart-Ethernet-Intelligent-Communication-Converter/dp/B008GLUHW, Aug. 17, 2024, 4 pages.
"Screenshot of USWS Clean Fleet System Video," 1 page.
"Services—U.S. Well Services," http://uswellservices.com/services/, accessed Nov. 13, 2021, 10 pages.
"StarTech NETRS2321E 1 Port RS-232/422/485 Serial over IP Ethernet Device Server," StarTech, https://www.amazon.com/StarTech-NETRS2321E-RS232-Serial-Ethernet/dp/B000YN0N0S, May 31, 2014, 4 pages.
"StarTech.com 1 Port RS232 Serial to IP Ethernet Converter (NETRS2321P)," StarTech, hhtps://www.amazon.com/StarTech-com-Serial-Ethernet-Converter-NETRS232IP/dp/B00FJEHNSO, Oct. 9, 2014, 4 pages.
"TCP/IP Ethernet to Serial RS232 RS485 RS422 Converter," Atc, http://www.amazon.com/Ethernet-Serial-RS232-RS485-Converter/dp/B00ATV2DX2, Feb. 1, 2014, 2 pages.
Water and Glycol Heating Systems (https://www.heat-inc.com/wg-series-water-glycol-systems/) Jun. 18, 2018 (Jun. 18, 2018), entire document, especially WG Series Water Glycol Systems.
A. Abbott, Crippling the Innovation Economy: Regulatory Overreach at the Patent Office, Regulatory Transparency Project, Aug. 14, 2017, 35 pages.
A.B. Lobo Roberio et al., "Multipoint-Fiber-Optic Hot Spot Sensing Network Integrated Into High Power Transformer for Continuous Monitoring," IEEE Sensor Journal, Jul. 2008, vol. 8, No. 7, pp. 1264-1267.
A.H. Bonnett et al., "Squirrel Cage Rotor Options for A.C. Induction Motors," IEEE, accessed May 18, 2021, 4 pages.
A.T. Dufresne, How reliable are trial dates relied on by the PTAB in the Fintiv analysis? Perkins Cole, 2021, 3 pages.
About US, Moxastore, http://www.moxastore.com/aboutus.asp, Mar. 8, 2015, 1 page.
Accommodating Seismic Movement, Victaulic Company, 2015, https://web.archive.org/web/20150412042941/http://www.victauluic.com:80/en/business-solutions/solutions/accommoda . . . , 2 pages.
Affidavit of Duncan Hall, Internet Archives on Jun. 7, 2021, https://web.archive.org/web/20120917102614/http:/www.quincieoilfield.com/pdf/3.0%20Gardner%20Denver/2500/GD2500Q%200p%20&%20Service%20Manual.pdf, 76 pages.
AGS Large Diameter Solutions, Victaulic Company 2015, https://web.archive.org/web/20150419063052/http://www.victaulic.com:80/en/businesses-solutions/solutions/adavanced-gr . . . ,2 pages.
Albone, "Mobile Compressor Stations for Natural Gas Transmission Service," ASME 67-GT-33, Turbo Expo, Power for Land, Sea and Air, vol. 79887, p. 1-10, 1967.

America Invents Act, H.R. Rep. No. 112-98, Jun. 1, 2011, 165 pages.
American Petroleum Insitute, "Form—wound Squirrel-Cage Induction Motors—500 Horsepower and Larger," Jun. 2004, Fourth Edition, ANSI/API Standard 541-2003, 88 pages.
Approved American National Standard, ANSI/NEMA MG Jan. 2011, American National Standard Motors and Generators, Dec. 9, 2021, 636 pages.
Assignment record of U.S. Pat. No. 9,366,114 accessed Aug. 19, 2021, 2 pages.
ASTM International, "Standard Specification for Steel Bars, carbon and Alloy, Hot-Wrought, General Requirements" Oct. 13, 2006, 16 pages.
Austin H. Bonnett, "Root Cause Failure Analysis for AC Induction Motors in the Petroleum and Chemical Industry," 2010, IEEE, Paper No. PCIC-2010-43, 13 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Bill Lockley and Barry Wood, "What do the API Motor/ Generator Features Cost and What Do They Buy You?" 2010 IEEE, Paper No. PCIC-2010-22, 10 pages.
C.F.R. Part 393 (Oct. 1, 2006), 36 pages.
Canadian Office Action issued Aug. 31, 2020 in Candian Patent Application No. 2,944,980.
Canadian Office Action issued in Canadian Application No. 3,094,768 mailed Oct. 28, 2021.
Canadian Office Action issued Sep. 22, 2020 in Canadian Application No. 2,982,974.
Canadian Office Action issued Sep. 8, 2020 in Candian Patent Application No. 2,928,707.
Carolyn Davis "Natural Gas Finding Niche in E-Fracking, But Diesel Still Rules." Sep. 6, 2019, Natural Gas Intel, https://www.naturalgasintel.com/natural-gas-finding-niche-in-e-fracking-but-still-rules, 9 pages.
Centers for Disease Control and Prevention, NIOSH Numbered Publications, https://web.archive.org/web/20120721180008/http://www.cdc.org/niosh/pubs/all_date_esc_nopubnumbers.htlm, 2021, 57 pages.
Chiksan Original Swivel Joints, FMC, 1997, 16 pages.
Clean Fleet Reduces Emissions by 99% at Hydraulic Fracturing Sites, Fluid Power Journal, https://fluidpowerjournal.com/clean-fleet-reduces-emissions/, accessed Sep. 22, 2021, 5 pages.
Collins English Dictionary, Twelfth Edition, 2014, p. 1005.
Comprehensive Power: Power it Up, Brochure, 26 pages.
Comprehensive Power: Power it Up, Feb. 27, 2013, 28 pages.
CoorsTek Flowguard Products, 2012, 8 pages.
D. Bogh et al., "A User's Guide to Factory Testing of Large Motors: What Should Your Witness Expect," IEEE accessed Jun. 10, 2021, 8 pages.
D. Heidel, Safety and Health Management Aspects for Handling Silica-based Products and Engineered Nanoparticles in Sequence of Shale Reservoir Stimulations Operations, Society of Petroleum Engineers, 2004, 4 pages.
Dan T. Ton & Merrill A. Smith, The U.S. Department of Energy's Microgrid Initiative, 25 The Electricity J. 84 (2012), pp. 84-94.
Dani Kass, "Fintiv Fails: PTAB Uses 'Remarkably Inaccurate' Trail Dates," Nov. 2, 2021, Law 360, 1 page.
Declaration of Dr. L. Brun Hilbert, Jr., P.E., IPR2021-01538, Sep. 22, 2021, 99 pages.
Declaration of Dr. L. Brun Hilbert, P.E., IPR2021-01037 and IPR2021-01038, Jun. 21, 2021, 124 pages.
Declaration of Dr. Mark Ehsani, IPR2021-01035, Jun. 18, 2021, 188 pages.
*Transcend Shipping Systems LLC v Mediterranean Shipping Company S.A.*, Case No. 6:21-cv-00040, Doc 27, Order of Dismissal with Prejudice, Dec. 7, 2021, 1 page.
Transcend Shipping Systems, LLC et al. Case Nos. 6:20-cv-1195-ADA, 6:21-cv-0018-ADA, and 6:21-cv-0040-ADA, Doc 19, Proposed Amended Scheduling Order, Aug. 13, 2021, 6 pages.
U.S Well Services—Services, http://uswellservices/, accessed Nov. 13, 2021, 10 pages.

(56) References Cited

OTHER PUBLICATIONS

U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, https://web.archive.org/web/20150406152927/https://ww.osha.gov/, 4 pages.
U.S. Department of Labor—Occupational Safety and Health Administration, Hydraulic Fracturing and Flowback Hazards Other than Respirable Silica, 2014, 27 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
U.S. Well Services Investor and Analyst Update: Second Quarter 2021 in Review, 2021, 7 pages.
*U.S. Well Services, Inc and U.S. Well Services, LLC v Halliburton Company and Cimarex Energy Co.*, Case No. 6:21-cv-00367-ADA, Doc 56, Defendants' Opening Claim Construction Brief, Oct. 27, 2021, 46 pages.
*U.S. Well Services, Inc. and U.s Well Services, LLC v Halliburton Company and Cimarex Energy Co.*, Case No. 6:21-cv-00367-ADA, Defendants' preliminary Invalidity Contentions, Sep. 10, 2021, 193 pages.
*U.S. Well Services, Inc. and U.s Well Services, LLC v Halliburton Company and Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
*U.S. Well Services, Inc. and U.s Well Services, LLC v Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.s Well Services, LLC v Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.s Well Services, LLC v Halliburton Company and Cimarex Energy Co.*, Case No. 6:21-cv-00367-ADA, Plaintiff's Disclosure of Asserted Claims and Preliminary Infringement Contentions, Jul. 12, 2021, 9 pages.
*U.S. Well Services, Inc. v Halliburton Company*, Case No. 6:21-cv-00367-ADA, Civil Docket, accessed Dec. 13, 2021, 14 pages.
*U.S. Well Services, Inc. v Halliburton Company*, Case No. 6:21-cv-00367-ADA, Doc 64, Order Resetting Markman hearing, Dec. 8, 2021, 1 page.
*U.S. Well Services, Inc. v Halliburton Company*, Case No. 6:21-v-00367-ADA, Civil Docket, accessed Dec. 17, 2021, 14 pages.
*U.S. Well Services, Inc. v. Halliburton Company*, Civil Docket for Case # 6:21-cv-00367-ADA, https://ecf.txwd.uscourts.gov/cgi-bin/DktRpt.pl?190912742001885-L_10_0-1, Accessed Nov. 29, 2021, 13 pages.
*U.S. Well Services, LLC v Tops Well Services, LLC and Honghua America, LLC*, Case No. 3:19-cv-00237, Document 1, Plaintiff's Original Complaint, 63 pages.
*U.S. Well Services, LLC v Tops Well Services, LLC and Honghua America, LLC*, Case No. 3:19-cv-00237, Document 72, Plaintiff's Opening Claim Construction Brief, Apr. 24, 2020, 37 pages.
*U.S. Well Services, LLC v Tops Well Services, LLC and Honghua America, LLC*, Case No. 3:19-cv-00237, Document 72-9, Declaration of Dr. Robert Schaaf—part 2, Apr. 24, 2020, 128 pages.
*U.S. Well Services, LLC v Tops Well Services, LLC and Honghua America, LLC*, Case No. 3:19-cv-00237, Document 72-9, Declaration of Dr. Robert Schaaf—part 3, Apr. 24, 2020, 47 pages.
*U.S. Well Services, LLC v Tops Well Services, LLC and Honghua America, LLC*, Case No. 3:19-cv-00237, Document 72-9, Declaration of Dr. Robert Schaaf, Apr. 24, 2020, 52 pages.
*U.S. Well Services, LLC v Tops Well Services, LLC and Honghua America, LLC*, Case No. 3:19-cv-00237, Document 90, Plaintiff's Opposition to Defendants' Motion for Summary Judgement of Invalidity under 35 USC 112, 30 pages.
*U.S. Well Services, LLC v Tops Well Services, LLC* Case No. 3:19-cv-237, Document 135, Order, Sep. 22, 2021, 2 pages.
*U.S. Well Services, LLC v Voltagrid LLC, Nathan Ough, Certarus (USA) Ltd., and Jared Oehring*, case No. 4:21-cv-3441-LHR, Doc 13, Plaintiff U.S. Well Services, LLC's Motion for Preliminary Injunction and Request for hearing, Nov. 4, 2021, 311 pages.
Victaulic Couplings Vibration Attenuation Characteristics, Victaulic, Publication 26.04, Oct. 2014, 5 pages.
Wire Rope Isolator Technologies, Enidine, Dec. 2011, 78 pages.
Woodbury et al., "Electrical Design Considerations for Drilling Rigs," IEEE Transactions on Industry Applications, vol. 1A-12, No. 4, Jul./Aug. 1976, pp. 421-431.
World's Best Swivel Joints, Flowvalve, 2013, https://web.archive.org/web/20150117041757/http://www.flowvalve.com:80/swivels, 10 pages.
Zeus Electric Pumping Unit, Halliburton, http://www.halliburton.com/en/products/zeus-electric-pumping-unit, 2021, 4 pages.
*U.S. Well Services, Inc., & U.S. Well Services, LLC v Halliburton Company, Cimarex Energy Co., Halliburton Energy Services, Inc., & Halliburton US Technologies, Inc.*, Case No. WA:21-CV-00367-ADA, Doc 61, Ordering Resetting Markman Hearing, Dec. 8, 2021, 1 page.
*U.S. Well Servies, Inc., and U.S. Well Services, LLC v Halliburton Company, Cimarex Energy Co., Halliburton Energy Services, Inc., and Halliburton US Technologies, Inc.*, Case No. WA:21-CV-00367-ADA, Doc 61, Order Setting Markman Hearing, Nov. 29, 2021, 1 page.
Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
*U.S. Well Services, Inc. and U.S. Well Services, LLC v Halliburton Company and Cimarex Energy Co.*, Case No. 6:21-CV-00367-ADA, Document 63, Defendants' Claim Construction Brief in Reply to U.S. Well Services, LLC's Responsive Brief, Dec. 2, 2021, 30 pages.
*U.S. Well Services, LLC v Tops Well Services, LLC and Honghua America, LLC*, Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
USPTO, Notice of Allowance issued in U.S. Appl. No. 18/512,755 on May 1, 2024, 5 pages.
USPTO, Non-Final Office Action issue in U.S. Appl. No. 18/512,755 on Jan. 23, 2024, 66 pages.
USPTO, Notice of Allowance issued in U.S. Appl. No. 17/959,465 on Nov. 7, 2023, 71 pages.
Gardner Denver, Well Servicing Pump Model GD-2500Q Quintuplex—Operating and Service Manual, Aug. 2005, 46 pages, 2005, 46 pages.
"Analysis of Vibration and Failure Problems in Reciprocating Triplex Pumps for Oil Pipelines,", J.C. Wachel et al., The American Society of Mechanical Engineers, Presented at the Energy-sources and Technology Conference and Exhibition, Dallas, Texas, Feb. 17-21, 1985, 8 pages.
Game-changing hydraulic fracturing technology, reduces emissions by 99%, "Intrado Globe News Wire", Oct. 1, 2014, https://www.globenewswire.com/fr/news-release-2014/10/01/670029/10100696/en/Game-changing-hydraulic-fracturing-technology-reduces-emissions-by-99.htlm, 4 pages.
""Growth in electric-fracking fleets stunted by tight producer budgets,"", Jodi Shafto, Aug. 6, 2019, S&P Global Market Intelligence, https://www.spglobal.com/marketintelligence/en/news-insights/latest-news-headlines/growth-in-electric-fracking-fleets-stunted-by tight-producer-budgets, accessed Sep. 16, 2021, 4 pages.
""U.S. Well Services Issues $125.5 Million Convertible Senior Secured PIK Notes, Executes License Agreement with ProFrac Manufacturing, LLC and Finalizes Amendment to Senior Secured Term Loan,","", Jun. 28, 2021, https://finance.yahoo.com/news/u-well-services-issues-125-203000637.html?guccounter+1, 6 pages.
""VZ Environmental Award of Excellence in Environmental Stewardship, Rocky Mountain 2016—awarded to U.S. Well Services, LLC""", Oil & Gas Awards, 2016, https://www.oilandgasawards.

(56) References Cited

OTHER PUBLICATIONS com/winner/rocky-mountain-2016-vz-enviormental-award-for-excellence-in-wnviormental-stewardship, accessed Aug. 23, 2021, 4 pages.
"Amazon.com purchase page for Electrical engineering Reference Manual for the Electrical and computer PE Exam", Sixth Edition, https://web.archive.org/web/20070103124447/https://www.amazon.com/Electrical-Engineering-Reference-Manual-Computer/dp/1888577568/, accessed Jul. 23, 2021, 7 pages.
"Professional Publications, Inc., FE Exam, PE Exam, ARE Exam, and NCIDQ Exam Review / Professional Engineering Licensing, About PPI,", https://web.archive.org/web/20031219231426/http://ppi2pass.com:80/catalog/servlet/MyPpi_pg_aboutppi.html, accessed Jul. 22, 2021, 1 pages.
"Professional Publications, Inc., FE Exam, PE Exam, ARE Exam, and NCIDQ Exam Review / Professional Engineering Licensing, Electrical PE Exam Review Products", https://web.archive.org/web/20040214233851/http://ppi2pass.com:80/catalog/servlet/MyPpi_ct_ELECTRICAL_, accessed Jul. 19, 2021, 7 pages.
"Professional Publications, Inc., FE Exam, PE Exam, ARE Exam, and NCIDQ Exam Review / Professional Engineering Licensing, Homepage", https://web.archive.org/web.archive.org/web/20040209054901/http://ppi2pass.com:80/catalog/servlet/MyPpi, accessed Jul. 2021, 1 page.
"Professional Publications, Inc., FE Exam, PE Exam, ARE Exam, and NCIDQ Exam Review / Professional Engineering Licensing, Instructor's Corner", https://web.archive.org/web/20031219232547/http://ppi2pass.com:80/catalog/servlet/MyPpi_pg_corner-corner.html, accessed Jul. 19, 2021, 2 pages.
M. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.
Maxwell James Clerk 1868, On Governors, proc. R. Soc. Lond., pp. 16270-16283.
Michael Quentin Morton, Unlocking the Earth: A Short History of Hydraulic Fracturing (2013), GeoExpro, vol. 10, No. 6, 5 pages.
Mike Soraghan, OSHA issues hazard alert for fracking and drilling, E&E, Dec. 10, 2014, 1 page.
Mohinder L. Nayyar, Piping Handbook Seventh Edition, McGraw-Hill Handbook, 2000, 77 pages.
Morris et al., U.S. Appl. No. 62/526,869; Hydration-Blender Transport and Electric Power Distribution for Fracturing Operation; Jun. 28, 2018; USPTO; see entire document.
Moxa 802.11 ethernet to Serial, Moxastore, http://www.moxastore.com/Moxa_802_11_Wi_Fi_Ethernet_to_Serial_s/587.html, May 24, 2016, 1 page.
National Electrical Manufacturers Association, NEMA ICS 61800-4 Adjustable Speed Electrical Power Drive Systems, Part 4: general requirements—rafting Specifications for A.C. Power Drive Systems above 1000 V a.c. and Not Exceeding 35 kV, 2004 22 pages.
New Technology Development Award—General/Products, Northeast 2015—Awarded to: U.S. Well Services, LLC, https://www.oilandgasawards.com/winner/northeast-2015-new-technology-development-award-generalproducts/#, accessed Aug. 23, 2021, 4 pages.
Non-Final Office Action issued in U.S. Appl. No. 14/881,525 mailed Jul. 21, 2021.
Non-Final Office Action issued in U.S. Appl. No. 16/404,283 mailed Jul. 21, 2021.
Non-Final Office Action issued in U.S. Appl. No. 16/871,928 mailed Aug. 25, 2021.
Non-Final Office Action issued in U.S. Appl. No. 16/901,774 mailed Sep. 14, 2021.
Non-Final Office Action issued in U.S. Appl. No. 16/943,727 mailed Aug. 3, 2021.
Non-Final Office Action issued in U.S. Appl. No. 17/060,647 mailed Sep. 20, 2021.
Non-Final Office Action issued in U.S. Appl. No. 16/564,186, mailed Oct. 15, 2021.
Non-Final Office Action issued in U.S. Appl. No. 16/871,328 mailed Dec. 9, 2021.
Non-Final Office Action issued in U.S. Appl. No. 16/943,935 mailed Oct. 21, 2021.
Non-Final Office action Mailed Aug. 31, 2020 in U.S. Appl. No. 16/167,083.
Non-Final Office Action mailed Jan. 29, 2021 in U.S. Appl. No. 16/564,185.
Non-Final Office Action mailed Jan. 4, 2021 in U.S. Appl. No. 16/522,043.
Non-Final Office Action Mailed Sep. 2, 2020 in U.S. Appl. No. 16/356,263.
Non-Final Office Action Mailed Sep. 29, 2020 in U.S. Appl. No. 16/943,727.
Non-Final Office Mailed Oct. 26, 2020 in U.S. Appl. No. 15/356,436.
Non-Final Office Mailed Oct. 5, 2020 in U.S. Appl. No. 16/443,273.
Notice of Allowance and Notice of Allowability issued in U.S. Appl. No. 15/829,419 mailed Jul. 26, 2021.
NPORTIA5250, Moxastore, http://www.moxastore.com/NPORTIA5250_p/nportia5250.htm.
Occupational Safety and Health Administration—Home, United States Department of Labor, https://web.archive.org/web/20120722160756/http://www.osha.gov/, accessed Jun. 13, 2021, 2 pages.
OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.
Portfolio Media Inc., A Shift to Sand: Spotlight on Silica Use in Fracking, Law360, https://www.law360.com/articles/366057/print?section=energy, accessed Jun. 10, 2021, 5 pages.
Professional Publications, Inc., Books for FE, PE, FLS and PLS Exams, Spring 2004, http://www.ppi2pass.com/corner/catalog.pdf, 16 pages.
Professional Publications, Inc., Electrical Engineering Reference Manual, 12 pages.
Project registration, Moxastore, http://www.moxastore.com, Feb. 15, 2015, 2 pages.
Publications, U.S. Department of Labor—Occupational Safety and Health Administration, https://web.archive.org/web/20150626140537/https://www.osha.gov/pls/publications.html, 47 pages.
Pulsation Dampers, Coorstek, 2014, https://web.archive.org/web/20140919005733/http://coorstek.com/markets/energy_equip . . . , 2 pages.
R. Misty et al., "Induction Motor Vibrations in view of the API 541—4th Edition," IEEE, accessed Jun. 10, 2021, 10 pages.
Random House Webster's Unabridged Dictionary, Second Edition, 2001, p. 990.
Ryan Davis, "Albright Says He'll Very Rarely Put Cases On Hold For PTAB," Law 360, https://www.law360.com/articles/1381597/print?section=ip, May 11, 2021, 2 pages.
Society of Automotive Engineers, SAE J1292: Automobile, Truck, Truck-Tractor, Trailer, and Motor Coach Wiring, 49 CFR 393.28, Oct. 1981, 6 pages.
Stan Gibilisco, The Illustrated Dictionary of Electronics: Audio/Video Consumer Electronics Wireless Technology—Eighth Edition, 2001, p. 667.
Standing Order Governing Proceedings—Patent Cases, in the United States district Court for the Western District of Texas, Waco Division, filed Nov. 17, 2021, 11 pages.
Stephen Cary et al., "Electric Rotating Machine Standards Part II: Magnetic Wedge Design & Monitoring Methods," 2011 IEEE, Paper No. PCIC-2011-41, 8 pages.
Steven C. Carlson, Weaponizing IPRs, Landslide, Sep. 22, 2019, 10 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
T.W. Pascall et al., "Navigating the Test Requirements of API 541 4th Edition," 2007, IEEE, Paper No. PCIC-2007-11, 12 pages.

(56) References Cited

OTHER PUBLICATIONS

Testimony of Judge Paul R. Michel (Ret.) United Stated Court of Appeals for the Federal Circuit Before the Subcommittee on Intellectual Property, U.S. Senate committee on the Judiciary, Jun. 4, 2019, 8 pages.
The American Heritage dictionary of the English Language, Fifth edition, Fiftieth Anniversary, 2018, p. 911.
Thorndike Saville, The Victaulic Pipe Joint, Journal of American Water Works Association, Nov. 1922, vol. 9, No. 6, pp. 921-927.
Tim Rahill and Micheal C. Fousha, "Sorting out the Overlap," Jan./Feb. 2009, IEEE Industry Applications Magazine, 12 pages.

* cited by examiner

ELECTRIC POWERED HYDRAULIC FRACTURING PUMP SYSTEM WITH SINGLE ELECTRIC POWERED MULTI-PLUNGER FRACTURING PUMP

CROSS REFERENCE TO RELATED APPLICATIONS

This application is a continuation of U.S. patent application Ser. No. 18/512,755, filed Nov. 17, 2023 and titled "ELECTRIC POWERED HYDRAULIC FRACTURING PUMP SYSTEM WITH SINGLE ELECTRIC POWERED MULTI-PLUNGER FRACTURING PUMP," which is a continuation of U.S. patent application Ser. No. 17/959,465, filed Oct. 4, 2022, now 11,905,806, and titled "ELECTRIC POWERED HYDRAULIC FRACTURING PUMP SYSTEM WITH SINGLE ELECTRIC POWERED MULTI-PLUNGER FRACTURING PUMP," which is a continuation of U.S. patent application Ser. No. 17/060,647, filed Oct. 1, 2020, now 11,459,863, and titled "ELECTRIC POWERED HYDRAULIC FRACTURING PUMP SYSTEM WITH SINGLE ELECTRIC POWERED MULTI-PLUNGER FRACTURING PUMP," which claims priority to and the benefit of co-pending U.S. Provisional Application Ser. No. 62/910,163 filed Oct. 3, 2019 titled "ELECTRIC POWERED HYDRAULIC FRACTURING PUMP SYSTEM WITH SINGLE ELECTRIC SEPTUPLEX FRACTURING PUMP," the full disclosures of which are hereby incorporated herein by reference in their entirety for all purposes.

BACKGROUND

1. Technical Field

This disclosure relates generally to hydraulic fracturing and more particularly to systems and methods for compact modular trailer arrangements for electric powered multi-plunger fracturing pump systems.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems the fracturing equipment runs on diesel-generated mechanical power or by other internal combustion engines. Such engines may be very powerful, but have certain disadvantages. Diesel is more expensive, is less environmentally friendly, less safe, and heavier to transport than natural gas. For example, heavy diesel engines may require the use of a large amount of heavy equipment, including trailers and trucks, to transport the engines to and from a wellsite. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations requires constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering fracturing operations.

Though less expensive to operate, safer, and more environmentally friendly, turbine generators come with their own limitations and difficulties as well. As is well known, turbines generally operate more efficiently at higher loads. Many power plants or industrial plants steadily operate turbines at 98% to 99% of their maximum potential to achieve the greatest efficiency and maintain this level of use without significant difficulty. This is due in part to these plants having a steady power demand that either does not fluctuate (i.e., constant power demand), or having sufficient warning if a load will change (e.g., when shutting down or starting up a factory process).

Space is at a premium at a fracturing site, where different vendors are often working simultaneously to prepare for a fracturing operation. As a result, utilizing systems that have large footprints may be undesirable. However, pressure pumpers still need to be able to provide sufficient pumping capacity in order to complete fracturing jobs.

SUMMARY

The present disclosure is directed to a method and system for a modular switchgear system and power distribution for electric oilfield equipment.

In an embodiment, a hydraulic fracturing system includes a support structure having a first area at a first height and a second area at a second height, the first and second areas adjacent one another. The system also includes an electric powered, multi-plunger pump with an odd number of plungers, arranged in the first area, the electric powered pump coupled to a well, via outlet piping, and powered by at least one electric motor, also arranged in the first area. The system further includes a variable frequency drive (VFD), arranged in the second area, connected to the at least one electric motor, the VFD configured to control at least a speed of the at least one electric motor. The system also includes a transformer, arranged in the second area, the transformer positioned within an enclosure with the VFD, the transformer distributing power to the electric pump.

In an embodiment, a hydraulic fracturing system includes an electric powered, multi-plunger pump, arranged on a support structure, the electric powered multi-plunger pump powered by at least one electric motor. The system also includes a variable frequency drive (VFD), arranged on the support structure, connected to the at least one electric motor to control a speed of the at least one electric motor, the variable VFD positioned separate from the electric powered, multi-plunger pump and within an enclosure. The system further includes a transformer, arranged on the support structure, distributing power to the electric powered, multi-plunger pump, the power being received from the least one generator at a voltage higher than an operating voltage of the electric powered pump, the transformer positioned within the enclosure. The electric powered, multi-plunger pump includes an odd number of plungers and provides a first pump output greater than or equal to a second pump output associated with two quintuplex pumps.

In an embodiment, a pumping unit may include a multi-plunger hydraulic fracturing pump with an odd number of plungers greater than 5 (e.g., 7, 9, 11, etc.). The odd number of plungers may produce less kinematic flow ripple than a standard quintuplex pump, which is the most common type of pump in the oil service industry.

In an embodiment, a pumping unit may include a seven plunger (septuplex) hydraulic fracturing pump. The septuplex pump may produce less kinematic flow ripple than the standard quintuplex, which is the most common type of pump in the oil service industry.

In various embodiments, one or more pumping units that include a septuplex pump may reduce the number of units required for hydraulic fracturing. By way of example only, 8 septuplex (7 plungers) pumps with 5" plungers and 10" stroke length can do the same work as 16 quintuplex pumps with 4.5" plungers and 8" stroke length (which is currently the most common pump in the industry). Accordingly, the septuplex pump with bigger plunger bores and longer stroke length than the common quintuplex pump can displace roughly 2 quintuplex pump units for every single septuplex unit.

Embodiments of the present disclosure also provide improved mobility and smaller footprints due to significantly short trailer length than common quintuplex hydraulic fracturing pump units.

Furthermore, various embodiments may arrange a transformer and variable frequency drive (VFD) in the same enclosure to minimize space requirements. Additionally, a VFD liquid cooling system may be packaged in the transformer enclosure.

Embodiments further include ladder access to gooseneck area for servicing or troubleshooting the transformer or VFD that is away from the "red zone" area of the high pressure pump discharge. Moreover, a VFD and a human-machine interface (HMI) screen may be arranged on the same service platform to allow for maintenance to work on the VFD while also seeing pump controls from the same place. Furthermore, a Motor Control Center (MCC) may also be positioned on the gooseneck of the trailer with ladder access from the ground.

Embodiments further include handrails incorporated on the platform to allow for easy maintenance.

BRIEF DESCRIPTION OF DRAWINGS

Some of the features and benefits of the present disclosure having been stated, others will become apparent as the description proceeds when taken in conjunction with the accompanying drawings, in which.

Figure 1:
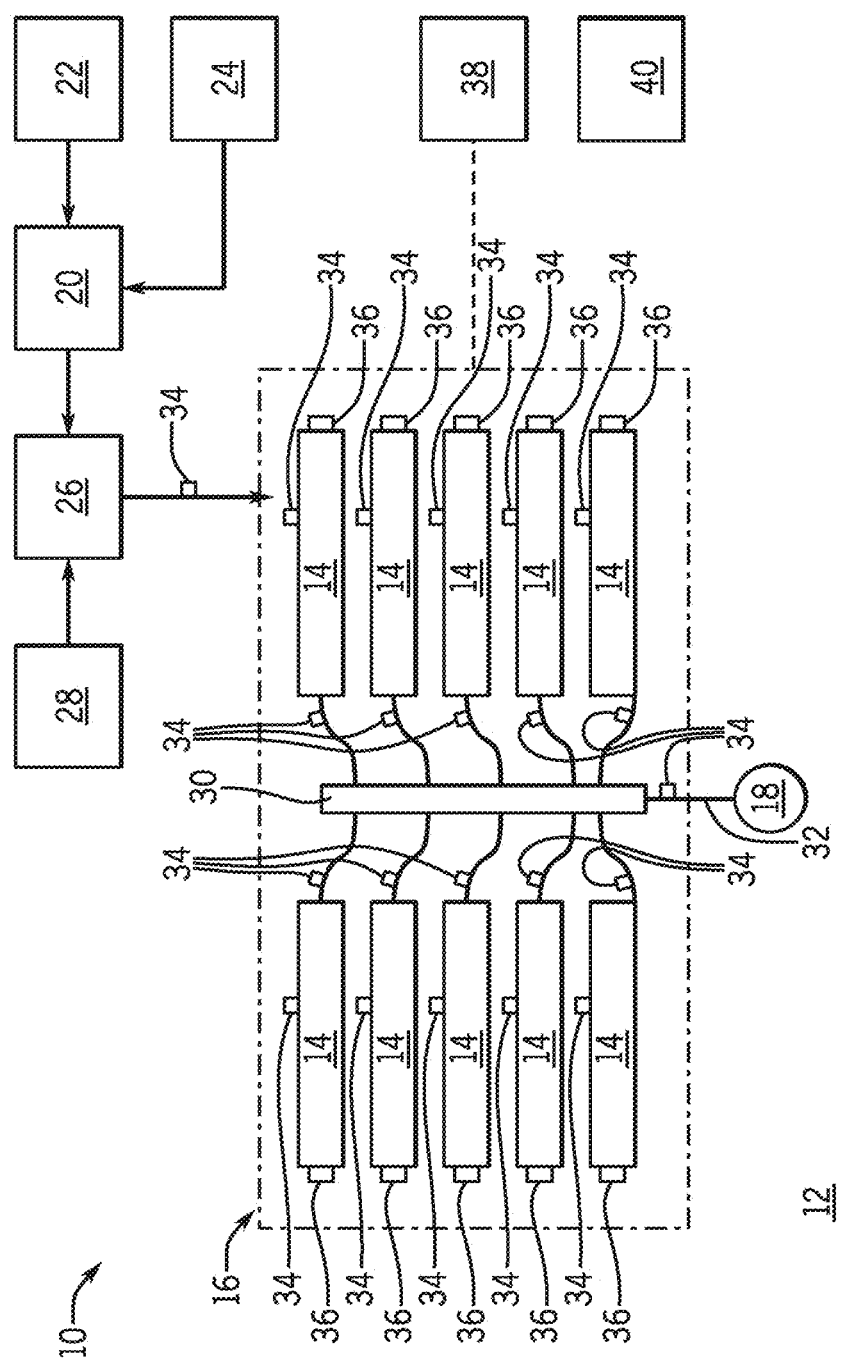
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the terms "about" or "approximately" include +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise. Additionally, recitation of pumps or motors having a certain output or voltage may refer to a rated output or a rated voltage and not necessarily and actual operating parameter.

Embodiments of the present disclosure describe a pumping unit that may include a multi-plunger hydraulic fracturing pump, such as a septuplex pump, to facilitate larger pumping capacity while also reducing a size of a footprint at a fracturing site. In various embodiments, the septuplex pump may be utilized to replace smaller pumps, such as quintuplex pumps. Additionally, the septuplex pump may include larger bores and/or longer stroke lengths. By way of example, the septuplex pump may be configured to displace approximately 2 quintuplex pump units for every single septuplex pump units, which may decrease the overall occupied footprint at the well site, among other benefits. In embodiments where even more plungers are used (e.g., 9, 11, etc.), even more quintuplex pump units can be displaced. The septuplex pump, or other multi-plunger pumps, may be part of the pumping unit which may also include control or monitoring components, such as a motor control center (MCC) or a variable frequency drive (VFD). In various embodiments, the septuplex pump is electrically powered, for example via a generator arranged at a fracturing site.

FIG. 1 is a plan schematic view of an embodiment of a hydraulic fracturing system 10 positioned at a well site 12. In the illustrated embodiment, pump trucks 14, which make up a pumping system 16, are used to pressurize a slurry solution for injection into a wellhead 18. An optional hydration unit 20 receives fluid from a fluid source 22 via a line, such as a tubular, and also receives additives from an additive source 24. In an embodiment, the fluid is water and the additives are mixed together and transferred to a blender unit 26 where proppant from a proppant source 28 may be added to form the slurry solution (e.g., fracturing slurry) which is transferred to the pumping system 16. The pump trucks 14 (e.g., pumping units, pumping systems) may receive the slurry solution at a first pressure (e.g., 80 psi to 160 psi) and boost the pressure to around 15.000 psi for injection into the wellhead 18. In certain embodiments, the pump trucks 14 are powered by electric motors. It should be appreciated that the pump trucks 14 may also be utilized for other operations, either at lower pressure or higher pressure than hydraulic fracturing operations. As an example, one or more pump trucks 14 may be utilized for pump down operations, which may be at lower pressures.

After being discharged from the pump system 16, a distribution system 30, such as a missile, receives the slurry solution for injection into the wellhead 18. The distribution system 30 consolidates the slurry solution from each of the pump trucks 14 and includes discharge piping 32 coupled to the wellhead 18. In this manner, pressurized solution for hydraulic fracturing may be injected into the wellhead 18.

In the illustrated embodiment, one or more sensors 34, 36 are arranged throughout the hydraulic fracturing system 10 to measure various properties related to fluid flow, vibration, and the like.

A power generation system 40 is shown, which may include turbines, generators, switchgears, transformers, and the like. In various embodiments, the power generation system 40 provides energy for one or more operations at the well site. It should be appreciated that while various embodiments of the present disclosure may describe electric motors powering the pump trucks 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3 phase, 60 Hz, 690V electrical power. However, it should be appreciated that in other embodiments different power specifications may be utilized, such as 4160V or at different frequencies, such as 50 Hz. Accordingly, discussions herein with a particular type of power specification should not be interpreted as limited only to the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

FIGS. 2-5 include views of an embodiment of a pumping unit. The illustrated pumping unit includes a pump, which may be a septuplex pump, arranged on a trailer. It should be appreciated that other multi-plunger pumps may also be utilized with similar configurations, and in various embodiments, the multi-plunger pumps may have an odd number of plungers (e.g., 5, 7, 9, 11, etc.) as noted herein. The trailer includes wheels to facilitate moving the pumping unit between various locations, such as to different well sites. In various embodiments, the pump may be operable on the trailer, which may reduce the time it takes to set up a well site, for example, due to moving or staging the pumps. Further illustrated are fluid connections, a motor for providing electric power to the pump, and a goose neck that includes a shelter for housing a motor control center (MCC) and variable frequency drive (VFD), as will be described below.

Figure 2:
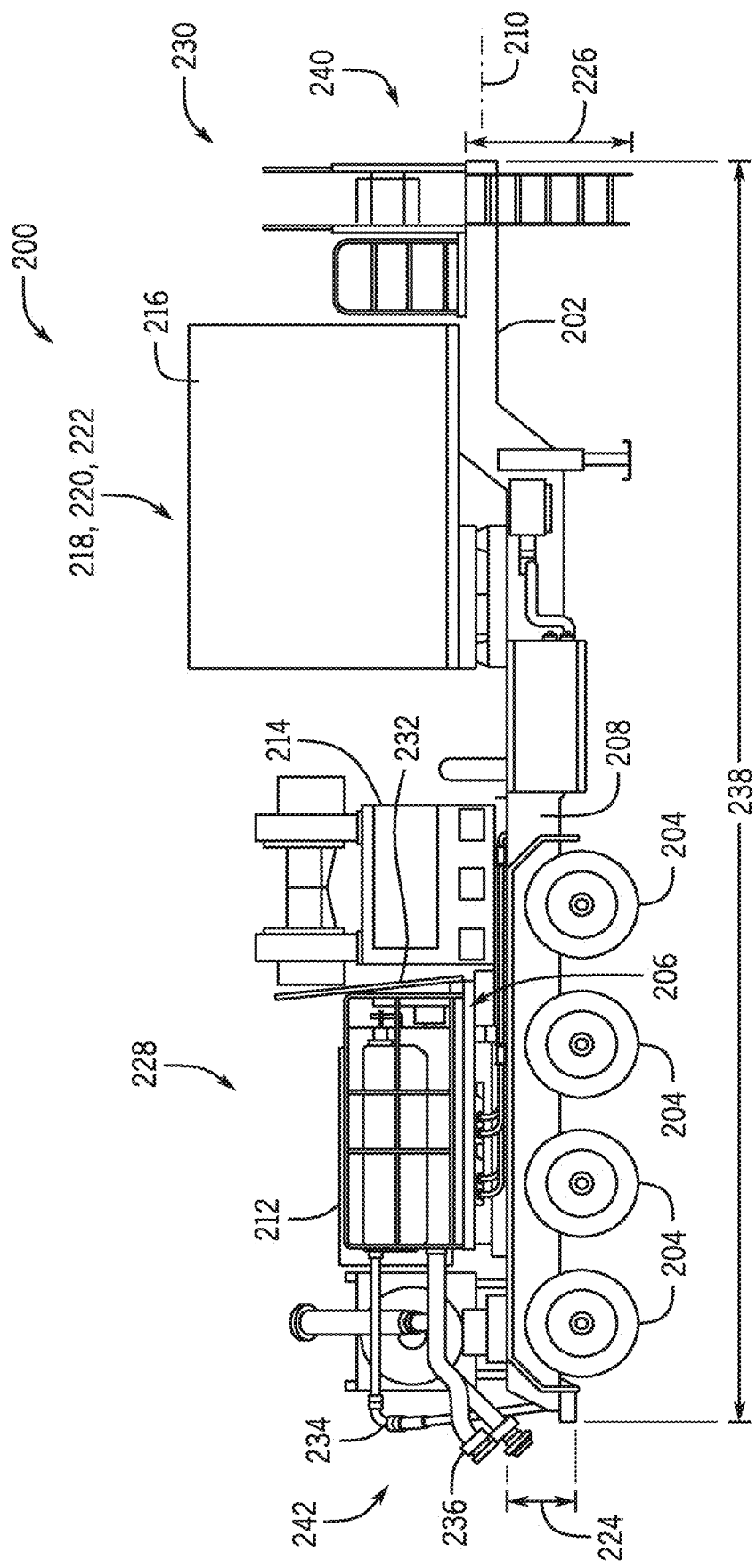
FIG. 2 is a side view of an embodiment of a pump unit, in accordance with embodiments of the present disclosure.

FIG. 2 is a side view of an embodiment of a pumping unit 200 that illustrates the passenger side (e.g., left side from a perspective of facing a front of the trailer). In various embodiments, the pumping unit 200 includes a trailer 202 having wheels 204 to facilitate transportation of the pumping unit 200 to various locations. It should be appreciated that while embodiments may be described with reference to the trailer 202, other configurations such as skids, platforms, truck beds, and the like may be utilized in various embodiments of the present disclosure. Accordingly, the use of the trailer in the figures is not intended to be limiting.

The illustrated trailer 202 includes a slide out platform 206, which may be extendable away from a trailer body 208 in a direction substantially perpendicular to a trailer axis 210. In other words, the slide out platform 206 extends outwardly relative to a plane of the page. The slide out platform 206 may be positioned on the illustrated passenger side, on the opposite driver side, or both. The slide out platform 206 may enable maintenance and service of various components of the pumping unit 200. By way of example only, the slide out platform 206 may provide an increased surface area for maintenance personnel to operate. The slide out platform 206 may be aligned with various components, such as a pump 212 (e.g., a multi-plunger electric powered pump), motor 214, blowers, and the like. Furthermore, various embodiments may include multiple slide out platforms 206, such as one aligned with an enclosure 216 for an HMI 218, VFD 220, transformer 222, and the like.

In this example, the illustrated trailer 202 may be referred to as a gooseneck trailer and includes a first height 224 and a second height 226. In this example, the second height 226 is greater than the first height 224. Different segments or portions of the illustrated embodiment are positioned at different locations along the trailer 202. For example, in this example, the motor 214 and pump 212 are at a first area 228 that corresponds to the first height 224 and the enclosure 216 and associated components are at a second area 230 that corresponds to the second height 226. It should be appreciated that this configuration may be reversed in other embodiments such that the motor and pump combination are at the second area 230.

Additional components are also illustrated in FIGS. 2-5, such as a motor coupling 232 between the motor 214 and the pump 212. The motor coupling 232 may transmit rotational energy of the motor 214 to the pump 212 to pressure fluid that may be introduced into the pump 212 through an inlet 236 and driven out at a higher pressure from an outlet 234. It should be appreciated that in various embodiments the motor 214 receives electrical energy from an on-site power source, which may include generators, turbines, power storage components, and the like. Accordingly, the fleet utilizing the pumping unit 200 may be electrically powered, thereby overcoming problems associated with traditional units that are powered using diesel or gasoline engines.

In this example, the trailer 202 has a trailer length 238 extending from a front end 240 to a back end 242. It should be appreciated that "front" and "back" are used illustratively, and in this instance the front end 240 refers to the second area 230 where the trailer 202 would be coupled to a prime mover and the back refers to the first area 228. In various embodiments, the trailer length 238 may be substantially equal to a trailer length for a unit that includes a single quintuplex or two quintuplex pumps. As a result, utilizing embodiments of multi-plunger pumping units, such as the illustrated unit that includes a septuplex pump, may provide an increased pumping capacity while occupying a similar or smaller footprint.

Figure 3:
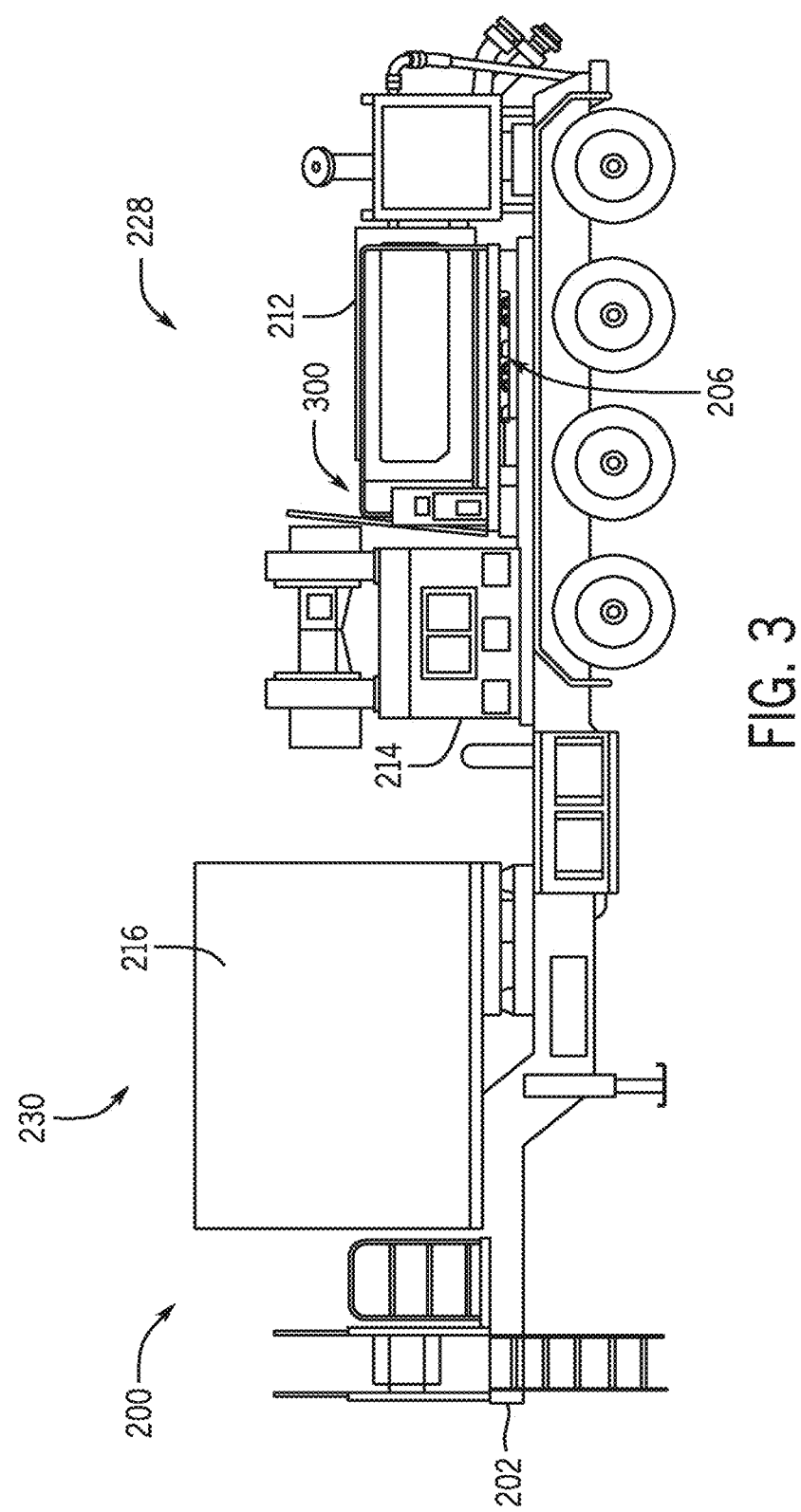
FIG. 3 is a side view of an embodiment of a pump unit, in accordance with embodiments of the present disclosure.

FIG. 3 is a side view of the pumping unit 200 from a driver side (e.g., right side when facing the front end 240). This example further illustrates the placement of various features of the pumping unit 200, including the pump 212, motor 214, and enclosure 216, which may house one or more of the HMI 218, VFD 220, and transformer 222. Moreover, as noted above, the slide out platform 206 may also be utilized on this side of the trailer 202 to facilitate maintenance operations. Additional features illustrated but not specifically described include auxiliary equipment 300 for the pump 212 and/or motor 214, such as a pump lube oil cooler, pump plunger lube system, blowers, and the like.

Figure 4:
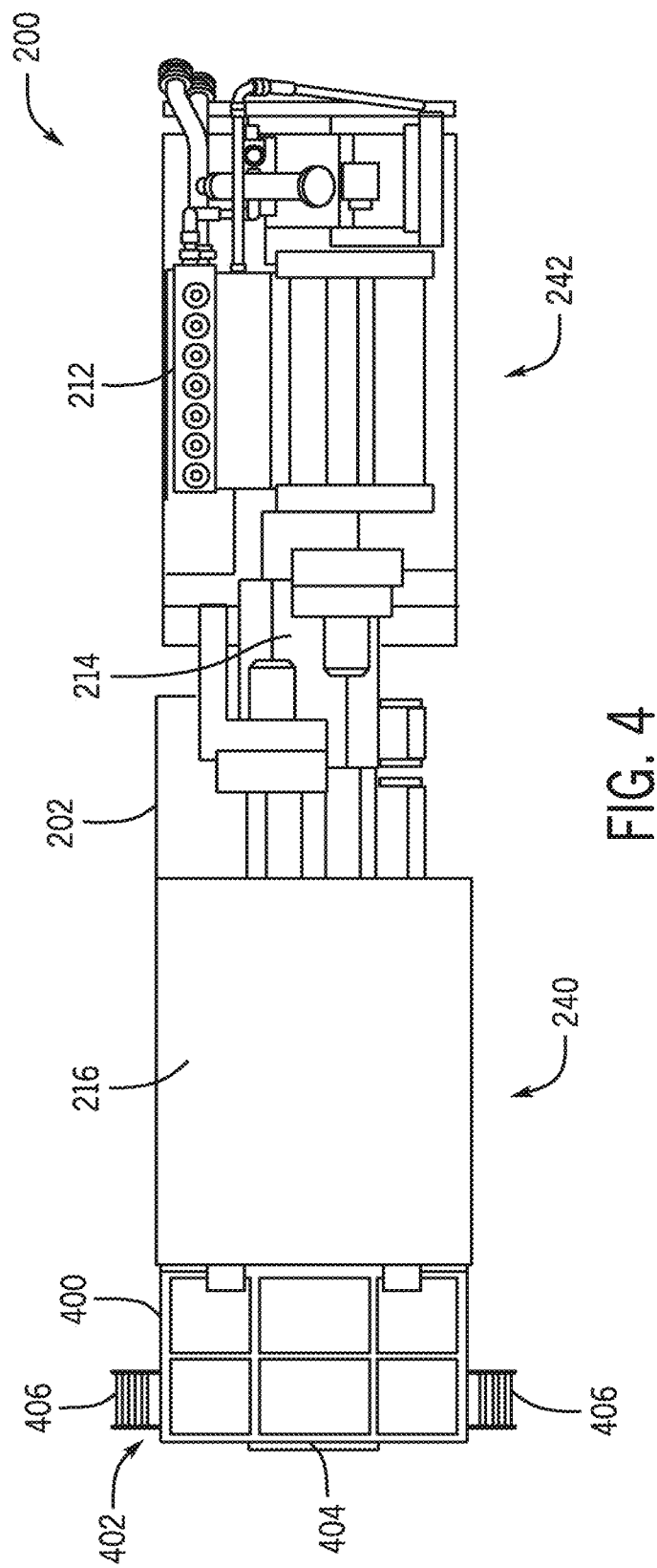
FIG. 4 is a top view of an embodiment of a pump unit, in accordance with embodiments of the present disclosure.

FIG. 4 is a top plan view of an embodiment of the pumping unit 200 illustrating the layout of the trailer 202 including the front end 240 and the back end 242. In this example, the front end 240 includes the enclosure 216 housing various components such as the HMI, VFD, transformer, a cooling system, and the like, which are not illustrated for clarity with the present discussion. In this example, an access platform 400 is provided such that an operator may enter the enclosure 216. As noted, the enclosure 216 may be climate controlled in order to provide a working environment for the operator as well as maintain a temperature and/or humidity level for the various electronic components contained therein. It should be appreciated that the components utilized with respect to the enclosure 216 may be considered Class 1, Division 1 compliant.

In certain embodiments, the access platform 400 includes a cable routing system 402 extending below a grating 404 which enables routing and various cables, such as cables from the generator or the like providing power to the transformer. The routing system 402 may include one or more channels that receive and direct the cables to a desired location. The grating 404 may be removable and/or pivotable to provide ready access to the one or more channels. Additionally, as shown, ingress and egress is provided by ladders or steps 406 provided on both sides of the platform 400.

As shown in FIG. 4, the first area 228 and second area 230 are separated or substantially spaced apart from one another, but are still structurally supported by the trailer 202. Accordingly, personnel working in the or around the enclosure 216 may be separated or within an appropriate distance from the pump 212 and/or motor 214 to facilitate operations.

Figure 5:
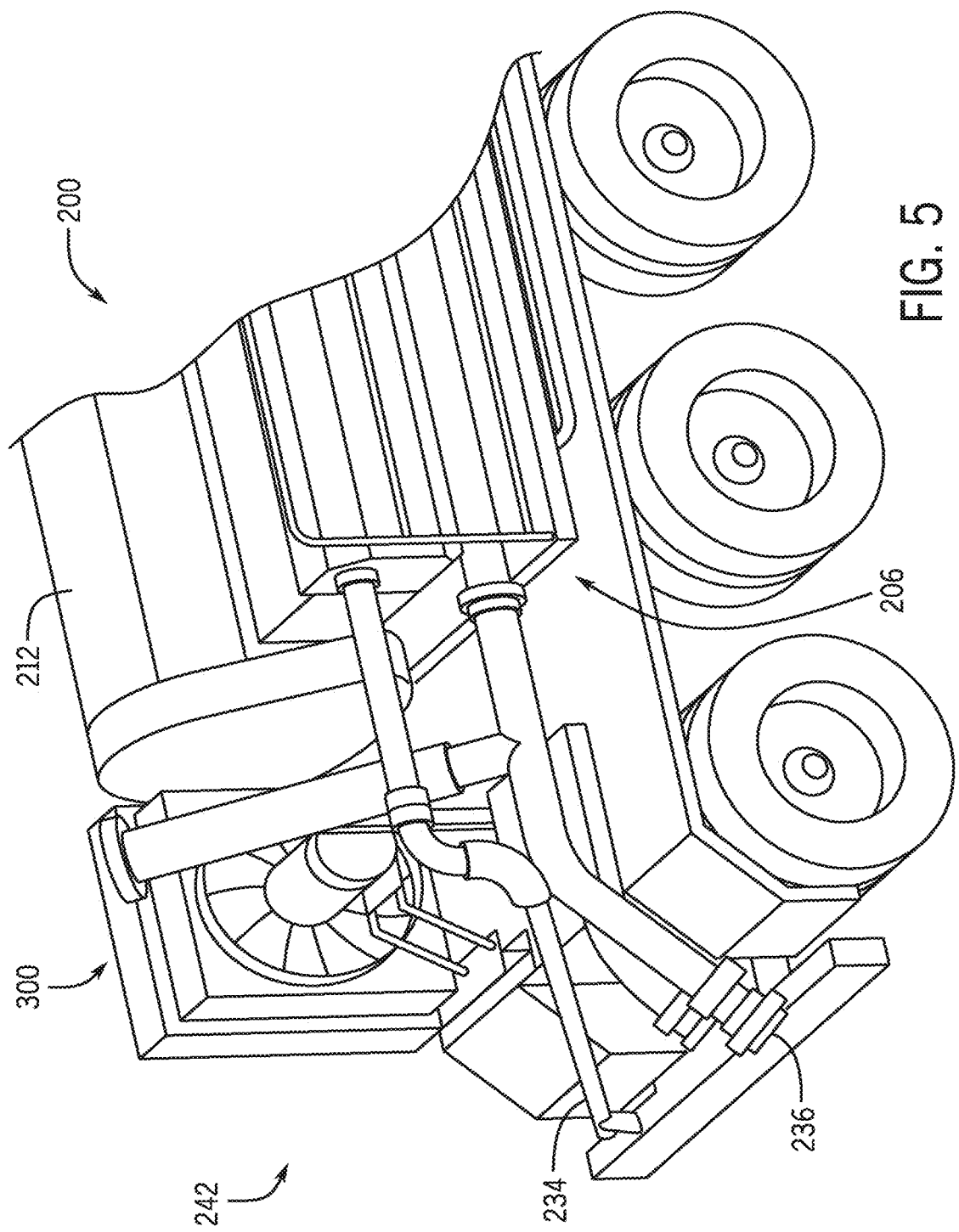
FIG. 5 is a partial isometric view of an embodiment of a pump unit, in accordance with embodiments of the present disclosure.

FIG. 5 is an isometric view of an embodiment of the back end 242 of the pumping unit 200 illustrating the inlet 236 (e.g., inlet piping), outlet 234 (e.g., outlet piping), and auxiliary equipment 300, such as the lube oil cooler. Additionally, a portion of the slide out platform 206 is also visible proximate the pump 212, which as noted above, may provide a working surface for maintenance or inspection of various components of the system.

As noted here, embodiments of the present disclosure illustrate the pumping unit 200 that includes the slide out platform for service of the pump or motor blowers, a coupling, an HMI, HMI-VFD, VFD/transformer enclosure, service platform for VFD/transformer, suction piping, and high pressure discharge piping. The pumping unit 200 may include a multi-plunger pump, such as a septuplex pump, motor, coupling, HMI, HMI-VFD platform, VFD/Transformer enclosure, service platform for VFD/Transformer, septuplex pump lube oil cooler, and pump plunger lube system.

In various embodiments, as noted above, the length 238 of the trailer 202 may be less than other pump units that may include multiple pumps arranged along the bed. For example, a trailer that includes two or more pumps may be longer than the trailer 202, which may be difficult to transport between well sites and also difficult to stage at the well site. However, other trailers may include multiple pumps in order to provide sufficient pumping capacity. As described, embodiments of the present disclosure may utilize the septuplex pump, or other pumps such as pumps including 9 plungers, 11 plungers, etc., with a bigger plunger bores and a longer stroke length to provide sufficient pumping capacity that may be substantially equal to two quintuplex pumps. Accordingly, the footprint at the well site may be decreased while also providing trailers that may be easier to transport and maneuver. Furthermore, it should be appreciated that while trailers are being referenced and illustrated, embodiments are not limited to trailers. For example, the trailer may be replaced with a skid, which may be loaded on a flat bed or the like, and may be movable to a desired location at the well site. In such a configuration, the skid may have a skid length that may also be shorter than a trailer length or skid length where multiple quintuplex pipes are used.

In embodiments, the pumping unit includes the single electric powered multi-plunger fracturing trailer. In this example, the pump is a septuplex pump that is capable of pumping inhibited acid and other proppant laden stimulation fluids and is further remotely operated from a control unit. The single electric motor is capable of delivering approximately 4000 BHP or approximately 3800 HHP based on efficiency losses, pump limitations, and varying conditions at time of operations. However, this configuration is for example purposes only and different sizes of motors and/or pumps may be utilized. Moreover, while embodiments may be described with respect to the trailer, other configurations such as skid-mounted or truck mounted systems may also be utilized with embodiments of the present disclosure that may use similar pumps.

Embodiments may be configured to reduce vibration during operations. For example, the pump unit may be configured such that while delivering full horsepower without exceeding the pump ratings, there are no components and/or substantially no components that will vibrate with excessive amplitudes in resonance with the forcing vibrations of the electric motor or pump. Also there are no and/or substantially no excessive rotational vibrations of electric motor or pump due to transmitted torque and the flexibility of the trailer and mounting systems. Due to the lower kinematic flow ripple of a septuplex pump versus a quintuplex, the septuplex will operate more smoothly. This may also be true for other pump configurations, such as pumps that include 9 plungers, 11 plungers, etc. Accordingly, there may be a reduced need to include dampening materials along the trailer and/or skid. Additionally, the reduced vibrations may enable components of the pumping unit to be positioned closer together, thereby further reducing the length of the trailer and providing a compact system.

In the illustrated embodiment, the VFD system is installed on the trailer and is packaged inside the transformer enclosure 216. The unit is capable of operating during prolonged pumping operations. The unit will typically be capable of operating in temperature ranges of approximately −40 C to 55 C, for example, but other ranges may also be utilized within embodiments of the present disclosure. The VFD may also be utilized to acquire motor diagnostics and may, in embodiments, provide one or more control signals to the motor. For example, the motor may receive a transmitted signal from the VFD to increase or decrease a rotational speed of the motor.

The illustrated trailer system is a heavy-duty single drop trailer in the embodiments shown in FIGS. 2-5. The trailers, as an example, may include several different features including, but not limited to a heavy-duty twin beam construction. This construction may provide sufficient strength to support and transport the pump 212, motor 214, and the like. As will be appreciated, a larger pump 212 may weigh more than a smaller pump, and as a result, a stronger trailer may be beneficial for prolonged operations. Additionally, the heavy-duty construction may also provide further vibration dampening.

Various embodiments may also include other features that facilitate loading, unloading, transportation, and storage of the trailer. By way of example, embodiments that include the trailer may include an approximately 52" kingpin setting (e.g., a 52" distance from the center of the fifth wheel connection to the center of the rear axle group). As will be appreciated, this distance may affect the turning radius of the wheels, with a longer kingpin setting providing a larger turning radius. The illustrated landing legs may be rated for approximately 160,000 pounds, thereby providing sufficient load capacity to enable operation of pumping unit. For example, the load capacity may be sufficient to enable the pumping units to be hauled to the well site, staged via the landing legs, and then operated using the landing legs, which reduces the presence of additional equipment, such as the trucks for hauling the pumping units, at the site. Additionally, the trailers may include an air ride suspension to provide a smoother, consistent ride quality. This system may also be coupled with ABS brakes and a heavy-duty tri or quad axle configuration. Various embodiments may also include 11.00 R 22.5 radial tires and a 2" SAE king pin with a rub plate. Furthermore, light mounted stop/turn clearance and mud flaps may be provided along with a rear bumper having a tow hook and additional running lights to enable highway use. The trailer may also include front and rear fenders.

FIGS. 2-4 illustrate the motor 214, which may provide the power to the pump 212 and also receives electricity from an onsite power plant in certain embodiments, such as a turbine generator. The illustrated motor 214 is a horizontal AC cage induction motor. It should be appreciated that various features and operating characteristics of the motor 214 may be particularly selected for a variety of different applications and operating conditions. In an embodiment, the motor 214 is capable of operation of upwards of 4000 HP with an operating voltage of 690V. The motor may be a 3 phase, insulation Class H, form wound, single shaft motor. It may include an oilfield hub and an air-condensation strip heater. In certain configurations, the motor also includes 100 ohm platinum resistance temperature detectors (RTDs) installed on windings (2 per phase) along with two cooling blowers rated at 15 HP, 3600 RPM, and 460 V.

As noted above, there is the motor coupling 232 arranged between the pump 212 and the motor 214 to transmit energy to the pump 212. In the illustrated embodiment, the coupling utilized for connecting electric motor to the pump does not exceed the manufacturer's recommended maximum angle under normal operation condition. The coupling includes a guard with an access panel to enable the pump to be turned without guard removal.

In various embodiments, a septuplex pump is utilized to pump fluids at a high pressure into a wellbore. However, as noted above, septuplex is provided as an example only. It should be appreciated that various different pumps, having a variety of different operating conditions and features, may be utilized. For example, the pumps may operate at a variety of different voltage inputs, with different voltage requirements, with different power inputs, and the like. By way of example only, the septuplex pump, or other pumps, may include stainless steel or alloy steel fluid ends. Further features may include a main discharge connection, bleed connection, center gauge connection, and zoomie suction manifold. In certain embodiments, the stroke length for the pump is approximately 10". However, it should be appreciated that this length may be adjusted and particularly selected based on a desired performance. As stroke length increases, pump flow rate may also increase. Additionally, in embodiments, the plunger size is approximately 5.0". However, it should be appreciated that this size may be adjusted and particularly selected based on a desired performance.

In embodiments, a double connection suction manifold extends into a zoomie style manifold that is bolted directly on the pump's fluid end. The double connections may be winged union connections and include two butterfly valves. A removable pulsation dampener is installed in the inlet side, in embodiments. The pump's rear discharge port is connected to the discharge manifold via 3" sub-connections. A 2" connection is installed on the pump center gauge opening and is utilized for the unit pressure transducer. In embodiments, the rear discharge manifold extends to the back of the trailer.

An electronically powered plunger lube pump system with pumping elements may also be installed to provide lubricant to the plungers. This system may be equipped with a pump speed input to adjust lubrication timing based on speed. However, other features may also be integrated, such as various instrumentation systems to monitor lube reservoir levels, pressures, and the like.

The power end of the pumps is lubricated by a hydraulic pump driven by an auxiliary electric motor. The power end lubrication system includes components such as relief valve, filters, instrumentation, plumbing, and lube oil reservoir. In various embodiments, the system further includes a transformer system comprised of a 4.000 kVA step down transformer and associated electrical components mounted on the trailer.

Embodiments further includes a transformer enclosure structure 216 constructed and braced for portable movement that has, by way of example only, features including a heavy-duty construction to enable movement and transportation of the trailer without disassembly of the enclosure 216. As an example, the construction may include cross-bracing and the like to provide improved strength and stability. Furthermore, the enclosure 216 may include a copper ground bus. NEMA 3R outdoor ventilation, and an ANSI 61 paint finish.

The enclosure 216 may house the transformer 222. In various embodiments, the transformer corresponds to a 4.000 kVA step down transformer. The transformer may be 3-phase transformer operable at 60 Hz with an 80/80 C rise, and may use either ambient air (AA) or forced air (FFA) for heat removal. The transformer may be manufactured with 7.0 percent impedance with an error range within an ANSI standard tolerance with a phase relation Dyn1.

The transformer may be a high voltage 13.8 kV delta having features including, but not limited to, 95 KV basic insulation level (BIL), taps, and a copper conductor. The transformer may also include a low voltage 600Y/346 with a 30 DV BIL, taps, and a copper conduction. Various embodiments also include application, rectifier duty, 6 pulse along with a core/coil with a high voltage (HV) to low voltage (LV) electrostatic shield with a K-factor rating. Embodiments may enable monitoring of control power and temperature. Furthermore, the transformer may include interconnect cables from a switchgear to the VFD. The cables may be 545 DLO cables installed to connect the transformer system to the VFD.

The VFD system 220 may be particularly selected to meet the electrical AC drive requirements for electric frac trailers that utilize 3 phase, 60 Hz, 690 volt electrical power sources. The system may also be built in strict accordance with NEMA. ANSI, and NFPA regulations. Additionally, design elements may meet the harsh environmental conditions typically found in oilfields. In certain embodiments, the VFD includes a 650V motor voltage with a drive current of approximately 2429 A. The VFD may have an overload rating of approximately 100% for 60 seconds and a supply voltage of approximately 690 V, 6 pulse. The supply frequency may be 60 Hz and the VFD may also include inverter modules and a cooling system that may utilize water/glycol as the cooling fluid. However, in certain embodiments, the VFD may be a 12 or 24 pulse drive.

Further embodiments may include drives having 2500 A circuit breakers with UVR trip coils and input line reactors. Semiconductor fuses with blown-fuse switches may also be incorporated. Control components may also be utilized to enable remote operation of various components of the pumping unit. Additionally, liquid cooled rectifier, 3 inverter IGBT modules, and 3 SMPS modules may also be incorporated into the system. Various configurations may include shielded ribbon cables and a digital controller with parameter based operations and I/O board. A door-mounted HMI may also be used for setup, monitoring, and diagnostics. Additional features may also include a MV 4000 I/O panel, control power transformer, a 24 V power supply, and relays, indicating lights, and emergency stop push buttons.

The VFD may also incorporate liquid cooling, as described above, that may include welded stainless steel piping coolant headers with hose connections to the modules. Stainless steel piping is used for VFD module headers. Each module is connected to the supply and return headers with a three-quarter inch hose and isolation valve, in an embodiment.

The VFD enclosure of the illustrated embodiment, but which may also be integrated with or replaced by other configurations, is an IP66 enclosure that includes two internal heat exchangers for removing heat form the air inside of the drive enclosure. Additionally, four frames are suppled in the enclosure for power cabling, control cables, and piping. Furthermore, a rain shield which extends out over the service platform to protect the components from rain while being serviced. The unit further includes has a dry type 3 phase, 60 Hz, power distribution transformer with 690 V primary, and 240/120 V secondary with taps.

The power control enclosure, which may be incorporated into or be part of the enclosure 216, is an outdoor weatherproof enclosure. The structure is constructed and braced for portable movement and includes access panels, external off unit connections wired to plug-in connectors accessible from outside, primed and finished painted inside and out, LED external lighting, cooling provided via liquid cooled radiator, and in embodiments the frac pump motor is hard wired on the unit.

In embodiments, the MCC and distribution panel is a 690V power distribution panel/MCC that is fed by a circuit breaker independent from the VFD circuits. By way of example, the MCC may be a single MCC that is seismic zone 4. The MCC may include a 400 A main bus with a rating of approximately 42,000 AIC, 60 Hz, and be 3 phase, 3 wire.

In embodiments, there are four size 1 full voltage non-reversing starters of 10 HP with hands off auto switch. In further embodiments, there are two size 2 full voltage non-reversing starters of 25 HP with hands off auto switch. Additionally, there is one lighting panel, 150 A, with circuit breakers as required.

As noted above, various instrumentation systems may also be included in order to monitor various aspects of the system. For example, supplied and installed on each of the pump discharge unit may be a pressure transducer. In an example, a 0-15.000 PSI pressure transducer with hammer union connections may be utilized, but other connections and pressure transducers may be used. The transducers are installed with a protective guard. Moreover, there may be a single touchscreen display for local pump control. Furthermore, the unit comes installed with either Ethernet communications or RS-485 serial, thereby facilitating remote operation and data transmission. It may also be equipped with wireless communications to sensors in lieu of cabled communication and sensor connections.

Various additional components of the instrumentation system and support systems may include an access hatch on the coupling guard, cable gland protection, check valve bracket support, and spools for the frac cables. Furthermore, various embodiments may also incorporate step grip tape on the handrails and ladder, grounding for the trailer, ladder/stair access with handrails, a land gear crank, an oil radiator bracket, and a power end tank temp sensor. Furthermore, configurations may also provide a fire extinguisher along the trailer.

As noted above, the slide out platform 206 may be incorporated for work on the pump, motor, and motor cooling blowers. In various configurations, the slide out platform 206 may also include a safety hinged door. Embodiments may also include VFD over pressure trip wiring which can bypass the normal S-curve ramp down used to increase electrical and mechanical component longevity to instantly stop the electric motor and associated pump. Furthermore, the VFD and associated control system can have wireless communication capabilities. Additionally, Victaulic™ clamps may be used on the suction side piping of the pump. In certain configurations, a transformer louver design may include a large metal mesh filter to prevent dust/dirt intrusion. Additionally, load shedding may be incorporated via intelligent pump control throttle control and other load responses.

As described, in various embodiments the system may be powered by an onsite generator, such as a turbine generator. However, it should be appreciated that various power generation operations are available, including any one or more, alone or in combination, of the following: one or more turbine generators, one or more diesel generators, one or more natural gas generators, grid power, any other electrical source, or a combination thereof.

Furthermore, as described, in embodiments various specifications are provided for illustrated purposes and are not intended to restrict or otherwise narrow the scope of the pending disclosure. For example, various other combinations and features of the above may be utilized. For example, the multi-plunger pump can have any odd numbers of plungers greater than 5 (e.g., 7, 9, 11, etc.). In various embodiments, the greater the odd number, the less kinematic ripple will exist. Additionally, the stroke length of the pump can be 8" or more. Furthermore, the pump unit can be on a trailer, skid, body load, or any other platform. Additionally, there can be multiple frac pump units. Moreover, there can be diesel pumps as well as electric pumps (hybrid fleet). Additionally, there can also be an intensifier pump connected hydraulically to the pumps. Additionally, one or more pumps can be used to pump down a tool into the well instead of doing pressure pumping. Furthermore, voltages may be different. Also, the components described can be separated and put on separate platforms that may themselves be on a trailer, skid, body load, or other platform.

Furthermore, alternative configurations may also include the secondary windings on the transformer being tapped at 690V, 600V, 480V. and 240/120V. Additionally, the windings on the transformer can have additional taps for +/−2.5%, 5%, 7.5%, and 10% to adjust the secondary voltage. This is used to combat voltage drop due to long range power transmission. Moreover, the power cables feeding the transformer can be jacketed 3 phase cables with imbedded ground and ground check conductors, or they can be single conductor cables with one or more conductors required per phase. Also, primary transformer voltage can be 25 KV, 15 KV, 13.8 KV, 4160V, or 2000V. In various embodiments, the transformer can act as a step up transformer, step down transformer, or as an isolation transformer with a 1:1 primary to secondary voltage ratio. Additionally, the transformer can be wye-wye, wye-delta, delta-delta, or delta-wye configuration. In certain embodiments, an electric soft starter could also be used in place of a VFD for the primary frac motor. Further configurations may include VFD could be up to 5000 BHP and the motor could be rated to up to 5000 BHP. Additionally, the fluid pump could be rated for up to 5000 HHP. Moreover, the VFD can be air cooled instead of liquid cooled. Moreover, the VFD can use a combination of both air cooling and liquid cooling. Also, the transformer and VFD enclosures can have a positive pressure system to keep dust out. The transformer can use liquid or air cooling. Moreover, the VFD can be packaged separately from the transformer enclosure and the MCC can be packaged separately from the VFD and/or transformer enclosure.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

We claim:

1. A mobile hydraulic fracturing system, comprising:
   a trailer having a front end, a back end, a first area at a first height, and a second area at a second height that is greater than the first height, wherein at least a portion of the first area resides above a rear axle group of the trailer, and the second area resides forward of the first area;
   a hydraulic fracturing pump, the hydraulic fracturing pump supported by the first area of the trailer and being configured to pump hydraulic fracturing fluid, wherein the hydraulic fracturing pump is a septuplex pump, a 9-plunger pump, or an 11-plunger pump;
   an electric motor that drives the hydraulic fracturing pump, the electric motor supported by the first area of the trailer;
   an enclosure supported by the second area of the trailer; and
   a variable frequency drive (VFD) housed in the enclosure, the VFD being operably connected to the electric motor to control a speed of the electric motor.

2. The mobile hydraulic fracturing system of claim 1, comprising a slide out platform that is extendable from the first area of the trailer to allow maintenance, wherein the platform is aligned with at least one of the pump or the motor.

3. The mobile hydraulic fracturing system of claim 1, comprising an access platform that provides access for an operator to enter the enclosure in the second area.

4. The mobile hydraulic fracturing system of claim 1, wherein the enclosure comprises a cooling system operable to cool the VFD.

5. The mobile hydraulic fracturing system of claim 4, wherein the cooling system is a liquid cooling system.

6. The mobile hydraulic fracturing system of claim 1, wherein:
   the electric motor resides forward of the hydraulic fracturing pump;
   the enclosure resides forward of the electric motor; and
   the system includes an open space between the enclosure and the electric motor.

7. The mobile hydraulic fracturing system of claim 6, wherein:
   the hydraulic fracturing pump and the electric motor are both supported only by the first area of the trailer; and
   the enclosure is supported by both the first and second areas of the trailer.

8. The mobile hydraulic fracturing system of claim 6, wherein the trailer is a single drop trailer comprising a gooseneck area, and the system comprises a motor control center on the gooseneck area of the trailer.

9. The mobile hydraulic fracturing system of claim 1, comprising a human machine interface in the enclosure.

10. A mobile hydraulic fracturing method, comprising:
    pumping hydraulic fracturing fluid by operation of a hydraulic fracturing pump, wherein the hydraulic fracturing pump is a septuplex pump, a 9-plunger pump, or an 11-plunger pump, wherein the hydraulic fracturing pump is supported by a first area of a trailer, the trailer having a front end, a back end, the first area at a first height, and a second area at a second height that is greater than the first height, wherein at least a portion of the first area resides above a rear axle group of the trailer, and the second area resides forward of the first area;

driving the hydraulic fracturing pump by operation of an electric motor supported by the first area of the trailer; and controlling a speed of the electric motor by operation of a variable frequency drive (VFD) housed in an enclosure supported by the second area of the trailer.

11. The mobile hydraulic fracturing method of claim 10, wherein the trailer comprises:

a slide out platform that is extendable from the first area of the trailer to allow maintenance, wherein the platform is aligned with at least one of the pump or the motor; and an access platform that provides access for an operator to enter the enclosure.

12. The mobile hydraulic fracturing method of claim 10, comprising cooling the VFD by operation of a cooling system of the enclosure.

13. The mobile hydraulic fracturing method of claim 10, wherein:

the electric motor resides forward of the hydraulic fracturing pump;

the enclosure resides forward of the electric motor; and an open space is defined between the enclosure and the electric motor.

14. The mobile hydraulic fracturing method of claim 13, wherein:

the hydraulic fracturing pump and the electric motor are both fully supported by the first area of the trailer; and the enclosure is supported by both the first and second areas of the trailer.

15. The mobile hydraulic fracturing method of claim 13, wherein the trailer is a single drop trailer comprising a gooseneck area, and a motor control center is disposed on the gooseneck area of the trailer.

* * * * *